US 8,039,428 B2

(12) United States Patent
Rodrigues et al.

(10) Patent No.: US 8,039,428 B2
(45) Date of Patent: Oct. 18, 2011

(54) MODIFIED POLYSACCHARIDES

(75) Inventors: Klin A. Rodrigues, Signal Mountain, TN (US); John S. Thomaides, Berkeley Heights, NJ (US); A. Levent Cimecioglu, Princeton, NJ (US); Martin Crossman, Hixson, TN (US)

(73) Assignee: Akzo Nobel, N.V., Arnhem (NL)

( * ) Notice: Subject to any disclaimer, the term of this patent is extended or adjusted under 35 U.S.C. 154(b) by 0 days.

(21) Appl. No.: 12/760,088

(22) Filed: Apr. 14, 2010

(65) Prior Publication Data

US 2010/0197905 A1 Aug. 5, 2010

Related U.S. Application Data

(62) Division of application No. 11/275,109, filed on Dec. 11, 2005, now Pat. No. 7,727,945.

(60) Provisional application No. 60/699,690, filed on Jul. 15, 2005.

(51) Int. Cl.
C11D 3/22 (2006.01)
C11D 3/37 (2006.01)

(52) U.S. Cl. ........ 510/471; 510/247; 510/434; 510/474; 252/175

(58) Field of Classification Search .......... 510/247, 510/434, 471, 474; 252/175
See application file for complete search history.

(56) References Cited

U.S. PATENT DOCUMENTS

| 4,166,173 A | 8/1979 | Wurzburg et al. |
|---|---|---|
| 4,280,851 A | 7/1981 | Pitchon et al. |
| 4,600,472 A | 7/1986 | Pitchon et al. |
| 4,845,207 A | 7/1989 | t'Sas |
| 5,131,953 A | 7/1992 | Kasica et al. |
| 5,149,799 A | 9/1992 | Rubens |
| 5,318,635 A | 6/1994 | Kasica et al. |
| 5,326,864 A | 7/1994 | Besemer et al. |
| 5,501,814 A | 3/1996 | Engelskirchen et al. |
| 5,777,090 A | 7/1998 | Verraest et al. |
| 6,228,126 B1 * | 5/2001 | Cimecioglu et al. .......... 8/108.1 |
| 6,368,456 B1 * | 4/2002 | Cimecioglu et al. .......... 162/146 |
| 6,540,876 B1 | 4/2003 | Cimecioglu et al. |
| 6,586,588 B1 * | 7/2003 | Cimecioglu et al. .......... 536/104 |
| 6,872,821 B2 * | 3/2005 | Cimecioglu et al. .......... 536/104 |
| 7,247,722 B2 | 7/2007 | Cimecioglu et al. |
| 2003/0209336 A1 * | 11/2003 | Cimecioglu et al. ............ 162/81 |

FOREIGN PATENT DOCUMENTS

EP 0 107 962 A1 5/1984

(Continued)

OTHER PUBLICATIONS

Patent Abstract of JP 2003-321398.

(Continued)

*Primary Examiner* — Brian P Mruk
(74) *Attorney, Agent, or Firm* — Norris McLaughlin & Marcus P.A.; Mark D. Marin

(57) ABSTRACT

Modified polysaccharide polymers for use as anti-sealant and dispersant. The polymers are useful in compositions used in aqueous systems. The modified polysaccharides are also useful in detergent formulations, water treatment, dispersants and oilfield applications and as fiberglass binders. Such applications include a modified polysaccharide having up to about 70 mole % carboxyl groups per mole of polysaccharide ASU and up to about 20 mole % aldehyde groups per mole of polysaccharide ASU. The applications can also include a blend of modified polysaccharides and other synthetic polymers.

19 Claims, 2 Drawing Sheets

FOREIGN PATENT DOCUMENTS

| | | |
|---|---|---|
| EP | 0892041 | 1/1999 |
| EP | 1077221 | 2/2001 |
| EP | 1156065 | 11/2001 |
| EP | 1 036 799 B1 | 2/2008 |
| JP | 59-76598 | 5/1984 |
| JP | 1-44401 | 6/1989 |
| JP | 2001-122904 | 5/2001 |
| JP | 2001-329001 | 11/2001 |
| JP | 2003-321398 | 11/2003 |
| WO | WO8806143 | 8/1988 |
| WO | WO9638484 | 12/1996 |
| WO | WO9720905 | 6/1997 |
| WO | WO 99/28350 | 10/1999 |
| WO | WO0179122 | 10/2001 |
| WO | WO2004061067 | 7/2004 |

OTHER PUBLICATIONS

Modified Starches: Properties and Uses, Würzburg, Ed., CRC Press, Inc., Florida (1986).

R.L. Whistler; Methods in Carbohydrate Chemistry, "Carbohydrate Chemistry," vol. IV, pp. 279-312 (1964).

R.L. Whistler et al.; Starch: Chemistry & Technology, vol. II—Industrial Aspects, Ch. XIII, "Starch Derivatives," Academic Press, NY; pp. 293-432 (1967).

R.L. Whistler et al.; Industrial Gums, "Polysaccharides and Their Derivatives," 3rd Ed., Chapter 3 (1993).

R.L. Davidson et al.; "Water Soluble Resins," 2nd Ed., Chapter 2 (1968).

R.L. Davidson et al.; "Handbook of Water Soluble Gums and Resins," (1980).

* cited by examiner

7A1   7A2   7A3   7H1   7V1   7V2   602N

MODIFIED POLYSACCHARIDES

CROSS REFERENCE TO RELATED APPLICATIONS

The present application is a divisional application of U.S. Ser. No. 11/275,109, now U.S. Pat. No. 7,727,945 filed Dec. 11, 2005, which claims priority to U.S. Provisional Patent Application Ser. No. 60/699,690, filed Jul. 15, 2005.

BACKGROUND OF THE INVENTION

1. Field of the Invention

The present invention is directed towards polysaccharides modified with various moieties, including carboxylate, aldehyde, sulfonate, phosphate and phosphonate moieties. The present invention is also directed towards anti-scalant and/or dispersant formulations or compositions including such polymers and their use in aqueous systems, including scale minimization.

2. Background Information

Aqueous systems, such as boiler water or steam generating systems, cooling water systems, gas scrubbing systems, pulp and paper mill systems, desalination systems, fabric, dishware and hard surface cleaning systems and downhole systems encountered during the production of gas, oil, and geothermal wells, are well known. Often the water in these systems, either naturally or by contamination, contains ingredients such as inorganic particulates and/or salts. Inorganic particulates such as mud, silt and clay, tend to settle onto surfaces, thereby restricting water flow and heat transfer unless they are effectively dispersed. The salts can cause accumulation, deposition, and fouling problems in these aqueous systems if they are not kept in a soluble, suspended or dispersed state.

The inorganic salts are typically formed by the reaction of metal cations such as calcium, magnesium or barium with inorganic anions such as phosphate, carbonate and sulfate. When formed, the salts tend to be insoluble or have low solubility in water. As their concentration in solution increases, or as the pH and/or temperature of the water containing those salts changes, the salts can precipitate from solution, crystallize and form hard deposits or scale on surfaces. Such scale formation can be problematic in equipment such as heat transfer devices, boilers, secondary oil recovery wells, and automatic dishwashers, as well as on substrates washed with such hard waters, reducing the performance and life of the equipment.

In addition to scale formation, many cooling water systems made from carbon steel such as industrial cooling towers and heat exchangers experience corrosion problems. Attempts to prevent this corrosion are often made by adding various inhibitors such as orthophosphate and/or zinc compounds to the water. However, phosphate addition increases the formation of highly insoluble phosphate salts such as calcium phosphate. The addition of zinc compounds can lead to precipitation of insoluble salts such as zinc hydroxide and zinc phosphate.

Stabilization of aqueous systems containing scale-forming salts and inorganic particulates involves a variety of mechanisms. Inhibition is the conventional mechanism for eliminating the deleterious effect of scale-forming salts. In inhibition, one or more polymers are added that increase the solubility of the scale-forming salt in the aqueous system.

In treating cooling water, phosphonates and low molecular weight homopolymers tend to be the primary calcium carbonate inhibitors. However, these additives may not be enough under stressed conditions. Therefore there is a need for a polymer that can act as a crystal growth modifier for crystals formed in stressed conditions. Inhibitors previously mentioned may not be completely effective.

Another stabilization mechanism is the dispersion of precipitated salt crystals. Synthetic polymers having carboxylic acid groups function as good dispersants for precipitated salts such as calcium carbonates. In this mechanism, the crystals stay dispersed rather than dissolving in the aqueous solution.

A third stabilization mechanism involves interference and distortion of the crystal structure of the scale by the polymer, thereby making the scale less adherent to surfaces, other forming crystals or existing particulates.

The addition of synthetic polymers to cleaning compositions can also impart many useful functions to those compositions. For example, they can function either independently or concurrently as viscosity reducers in processing powdered detergents. They can also serve as anti-redeposition agents, dispersants, scale and deposit inhibitors, crystal modifiers, and/or detergent assistants capable of partially or completely replacing materials used as builders while imparting optimum detergent action properties to surfactants.

Cleaning formulations typically contain builders such as phosphates and carbonates for boosting their cleaning performance. However, these builders can also precipitate out insoluble salts such as calcium carbonate and calcium phosphate (in the form of calcium orthophosphate). The salt precipitants form deposits on clothes and dishware, resulting in unsightly films and spots on these articles. Similarly, insoluble salts can cause major problem in downhole oil field applications. Hence, there remains a need for polymers that minimize scaling from insoluble salts found in water treatment, oil field and cleaning formulations.

Synthetic polymers have been used to minimize scale formation in aqueous treatment systems for a number of years. For example, polymers such as polyacrylic acid have been used as calcium binding or calcium carbonate inhibiting agents, co-builders and dispersants in detergent and water treatment applications for decades. However, due to rising demand and tight crude oil supplies, there has recently been a shortage of monomers used in producing these synthetic polymers, driving up production costs for the polymers. Hence, there is a need for polymers from renewable natural sources to replace these synthetic polymers. As an added benefit, polymers from renewable natural sources should have a better biodegradability profile than synthetic polymers, which tend to have very little biodegradability.

Starches, including oxidized starches as well as other modified polysaccharides, have shown potential use as detergent additives in the past. For example, it is known to use oxidized inulin as calcium binding agents. Also, polysaccharide co-builders include those produced from oxidized glucosan, oxidized dextrins for use in detergent formulations, and low molecular weight carboxylated maltodextrins, likewise for use in detergent applications. Further, it is known to use modified polysaccharides as chelating agents. However, their performance has been weak at best when compared to synthetic polymers like polyacrylic acid.

Synthetic polymers are typically produced from petroleum-based feedstocks. The price of raw materials used to produce such synthetic polymers has risen sharply in the past few years. Accordingly, modified polysaccharides according to the present invention offer a benefit over synthetic polymers on a cost-performance basis.

It is also recognized that both synthetic and natural polymers containing carboxylic acid groups function well at inhibiting calcium carbonate. Generally speaking, the greater the amount of carboxylate functionality, the greater the amount of calcium carbonate inhibition that is provided. However, in most environments the amount of scale present is usually greater than what the polymer can inhibit. Hence, there is a need for polymers that can minimize calcium carbonate scale by a dispersion or crystal growth modification.

Polysaccharides modified with carboxylated groups have been previously proposed for calcium binding and hardness control. However, these naturally derived products tend not to be as effective as synthetic polymers in such applications, which is due at least in part to the limited amount of carboxylic groups that can be introduced onto the polysaccharide backbone. Therefore, synthetic polymers such as polyacrylic acid tend to contain more carboxylic acid functionality per gram of material than even highly oxidized polysaccharides. Furthermore, as the degree of substitution or oxidation increases, the biodegradability of polysaccharides decreases. Therefore, there still is a need for polysaccharides capable of functioning as scale control agents, dispersants and/or soil suspension agents.

Blends of synthetic polymers and natural polymers tend to be incompatible. Therefore, there is also a need for synthetic and natural polymers that are compatible with one another, enabling them to be blended together.

SUMMARY OF THE INVENTION

It has now been found that modified polysaccharides produced according to the process of the present invention have little or no calcium binding or co-building properties. However, these natural polymers have been found to be very good scale control agents as well as dispersants and soil suspension agents in detergent applications, in part due to their ability to disperse and/or modify crystal growth properties. Further, these modified polysaccharides have shown performance similar to or better than that of synthetic polymers.

By controlling the oxidation process, modified polysaccharides can be produced that perform well even though they have little or no calcium binding. While not being bound by theory, it is believed that relatively low amounts of substitution makes these molecules attractive to the growing crystal surface. As such, these molecules are able to function as crystal growth inhibitors and dispersants. Calcium binding or co-building properties of polysaccharides may never be as effective as synthetic polymers since synthetic polymers can carry more carboxylic acid per gram of polymer. Therefore, by maximizing their crystal growth modification and dispersive properties rather than calcium binding, these polymers can be as effective as or more effective than synthetic polymers in aqueous treatment applications like water treatment and detergents.

The present invention further discloses modified polysaccharides that are effective at minimizing a number of different scales, including phosphate, sulfonate, carbonate and silicate-based scales. These scale-minimizing polymers are useful in a variety of systems, including water treatment compositions, oil field related compositions such as cement compositions, cleaning formulations and other aqueous treatment compositions.

In one aspect, the weight average molecular weight of the modified polysaccharides is between 1000 and 10,000,000. In another aspect, the weight average molecular weight of the modified polysaccharides is between 1000 and 1,000,000. In even another aspect, the molecular weight of the modified polysaccharides is between 1000 and 350,000. In another aspect, the molecular weight of the modified polysaccharides is between 1000 and 100,000.

Modified polysaccharide polymers according to the present invention are useful in water or aqueous treatment systems for preventing scales such as calcium carbonate and phosphate scales. In such systems, the polymer is present in an amount of at least about 0.5 mg/L. The modified polysaccharides polymer is also useful in aqueous treatment compositions or formulations for preventing calcium scales in a water treatment system, wherein the polymer is present in the composition in an amount of about 10% to about 25% by weight of the composition.

The modified polysaccharide polymer can also be used in an aqueous system treatment composition for modifying calcium carbonate crystal growth, or for minimizing sulfate scale. Still further, the modified polysaccharide polymer can be used in an aqueous treatment system such as a water treatment system, oilfield system or cleaning system. When the aqueous system is an oilfield system, the sulfate scale minimized can be barium sulfate scale.

When present in aqueous treatment compositions, the modified polysaccharide is present in an amount of about 0.001% to about 25% by weight of the aqueous treatment composition. In another aspect, the polymer is present in an amount of about 0.5% to about 5% by weight of the composition.

The present invention further includes a mineral dispersant having the modified polysaccharides polymer. This mineral dispersant is able to disperse talc, titanium dioxide, mica, precipitated calcium carbonate, ground calcium carbonate, precipitated silica, silicate, iron oxide, clay, kaolin clay, gypsum or combinations thereof.

The modified polysaccharide polymer is also useful in cleaning formulations, wherein the polymer is present in an amount of about 0.01% to about 10% by weight of the cleaning formulation. Such cleaning formulations can include a phosphorus-based and/or carbonate builder. The cleaning formulation can be an automatic dishwashing detergent formulation. This automatic dishwashing detergent formulation can include builders, surfactants, enzymes, solvents, hydrotropes, fillers, bleach, perfumes and/or colorants.

In yet another aspect, the modified polysaccharide can be used as a binder for fiberglass. Fiberglass insulation products are generally formed by bonding glass fibers together with a polymeric binder. Typically, an aqueous polymer binder is sprayed onto matted glass fibers soon after they have been formed and while they are still hot. The polymer binder tends to accumulate at the junctions where fibers cross each other, thereby holding the fibers together at these points. Heat from the hot fibers vaporizes most of the water in the binder. The fiberglass binder must be flexible so that the final fiberglass product can be compressed for packaging and shipping and later recover to its full vertical dimension when installed.

In yet another aspect, addition of certain hydrophobic moieties produces stable blends of synthetic and these natural polymers.

The present invention further provides a process for preparing modified polysaccharide compositions with carboxyl and aldehyde functional groups. This process involves oxidation of the polysaccharide in an aqueous medium with an oxidant having an equivalent oxidizing power of up to 106.37 g active chlorine per mole of polysaccharide anhydrosugar unit ("ASU") and a mediating amount of nitroxyl radical. The reaction is carried out at a temperature from about 5° C. to about 50° C. and a pH of from about 6.0 to about 11.0. The resulting product can have up to about 70 mole % carboxyl groups per mole of polysaccharide ASU and up to about 20 mole % aldehyde groups per mole of polysaccharide ASU.

According to the process, controlled degradation of the oxidized polysaccharide occurs under alkaline conditions, forming a lower molecular weight version and ready-for-use (RFU) dispersion of the modified polysaccharide with carboxyl and aldehyde functional groups. Optionally, the resulting dispersion can be dried to form a cold water soluble (CWS) RFU powder version of the lower molecular weight modified polysaccharide with carboxyl and aldehyde functional groups.

Accordingly, the present invention provides for an aqueous treatment composition that includes at least one modified polysaccharide having up to about 70 mole % carboxyl groups per mole of polysaccharide ASU and up to about 20 mole % aldehyde groups per mole of polysaccharide ASU. The polysaccharide is present in the composition in an amount of at least about 0.5 mg/L, and the composition is able to prevent scale formation. In one aspect the polysaccharide is present in the composition in an amount of about 10% to about 25% by weight of the composition. The aqueous system treatment composition is suitable for modifying calcium carbonate crystal growth.

The composition can also optionally include one or more synthetic polymers. Examples of suitable polymers that work in conjunction with the polysaccharide include polymaleic acid, polyacrylic acid, polymethacrylic acid, acrylic maleic copolymers, acrylamide copolymers and copolymers containing sulfonation, where the sulfonation is provided by comonomers such as vinyl sulfonate, (meth)allyl sulfonate, (meth)acrylamido methyl propane sulfonic acid, sodium styrene sulfonate, sulfo-phenyl methallyl ether. All of these (co)polymers might further be modified with nonionic or hydrophobic moieties as required.

Further, synthetic or natural rheology modifiers suitable for use include crosslinked polyacrylic acid, methacrylic acid copolymers, polyurethanes, guar gum, xanthan gum, carboxymethyl cellulose and hydroxyethyl cellulose. Polymers and copolymers of vinyl pyrrolidone, vinyl imidazole, amines and amine oxides are also useful.

In a further aspect the aqueous treatment composition may further include at least one phosphonate moiety. This can be in the form of a blend of the at least one polysaccharide and at least one phosphonate moiety. Likewise, the aqueous treatment composition can be in the form of a blend of the at least one polysaccharide, at least one synthetic polymer and at least one phosphonate moiety.

The present invention further provides for a cleaning formulation having a modified polysaccharide having up to about 70 mole % carboxyl groups per mole of polysaccharide ASU and up to about 20 mole % aldehyde groups per mole of polysaccharide ASU. The polymer can be present in the formulation in an amount of about 0.01% to about 10% by weight of the cleaning formulation. The cleaning formulation can also include a phosphorus-based and/or a carbonate builder. In a further aspect, the cleaning formulation includes synthetic polymers.

In one embodiment the cleaning formulation is an automatic dishwashing detergent formulation. This automatic dishwashing detergent formulation can include, for example, builders, surfactants, enzymes, solvents, hydrotropes, fillers, bleach, perfumes and/or colorants.

The present invention further provides for a mineral dispersant having a modified polysaccharide having up to about 70 mole % carboxyl groups per mole of polysaccharide ASU and up to about 20 mole % aldehyde groups per mole of polysaccharide ASU. The mineral dispersed can be, for example, talc, titanium dioxide, mica, precipitated calcium carbonate, ground calcium carbonate, precipitated silica, silicate, iron oxide, clay, kaolin clay or combinations thereof.

The present invention further provides for an aqueous treatment system having a modified polysaccharide having up to about 70 mole % carboxyl groups per mole of polysaccharide ASU and up to about 20 mole % aldehyde groups per mole of polysaccharide ASU. The aqueous treatment system can be, for example, a water treatment system, oilfield system or cleaning system. When the system includes the modified polysaccharide, it is able to minimize carbonate, phosphate and sulfate scale. When the system is an oilfield system, the sulfate scale minimized can be, for example, barium sulfate scale.

In another embodiment, the present invention provides for a fiberglass binder having a modified polysaccharide having up to about 70 mole % carboxyl groups per mole of polysaccharide ASU and up to about 20 mole % aldehyde groups per mole of polysaccharide ASU.

The present invention also provides for a process for preparing an aqueous treatment composition. This process involves oxidizing a polysaccharide in an aqueous medium, wherein the aqueous medium has an oxidant having an equivalent oxidizing power of up to 106.37 g active chlorine per mole of polysaccharide anhydrosugar unit ("ASU") and a mediating amount of nitroxyl radical. The oxidized polysaccharide is then degraded, forming a dispersion of the low molecular weight version of the polysaccharide having carboxyl and aldehyde functional groups. When the polysaccharide is granular, such as a granular starch, it is filtered and washed to remove the nitroxyl mediator and any salt by-products prior to degradation. Once oxidized and degraded, this modified polysaccharide can then be added to the aqueous treatment composition. In an optional step, the polysaccharide can be modified by crosslinking. Crosslinking can be carried out prior to oxidation. This is especially beneficial when the polysaccharide is a granular starch. In an optional step, the polysaccharide dispersion can be dried prior to adding it to the aqueous treatment composition. This drying step can be performed by freeze-drying or by spray-drying the polysaccharide dispersion.

DETAILED DESCRIPTION OF THE INVENTION

Figure 1:
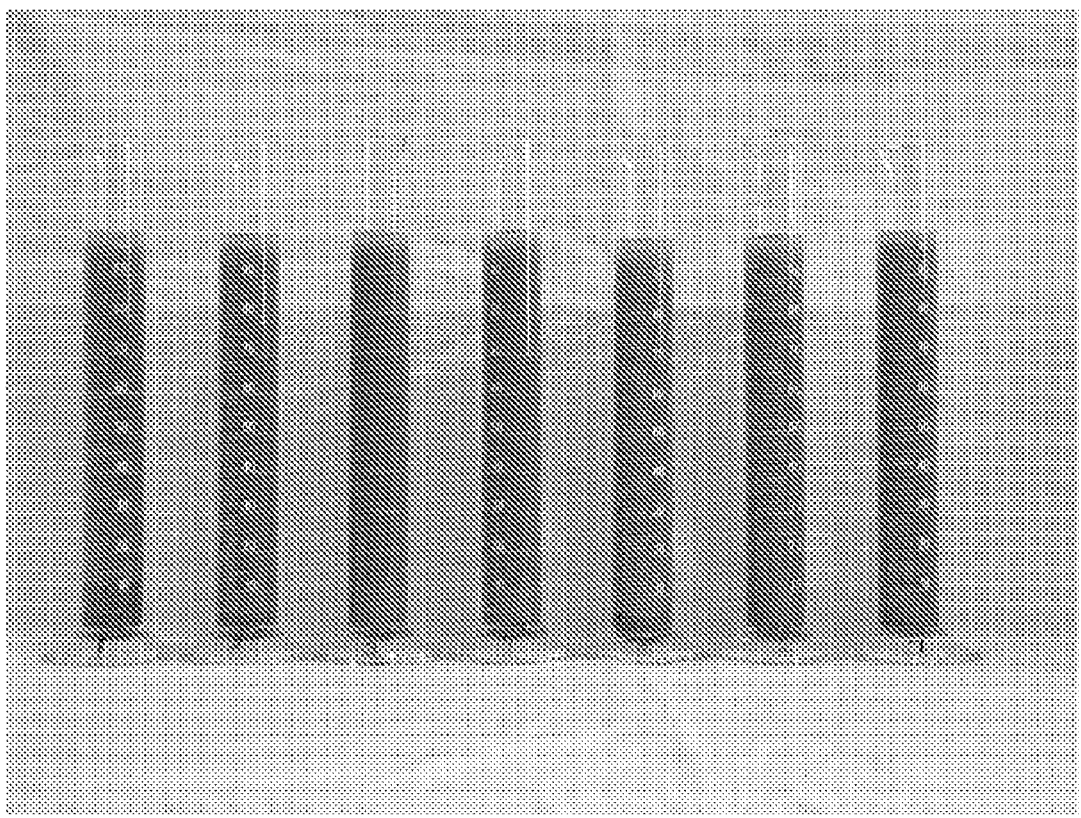
FIG. 1 is a 1 hour snapshot of dispersancy performance of six oxidized starch samples, all at 0.1%, and a 0.1% ALCOSPERSE® 602N detergent additive sample.

The modified polysaccharides polymers of the present invention provide excellent scale inhibition and deposition control under a wide variety of conditions. For instance, the inventive polymers have been found to minimize calcium carbonate scale formation and deposition.

The composition and molecular weight of the inventive polymers are such that they can act as a crystal modifier, thereby contributing to minimizing calcium carbonate scaling. Furthermore, the inventive polymers are effective at minimizing sulfate scale in oil field treatment applications.

The modified polysaccharides polymers are also highly effective at dispersing particulate matter such as minerals, clays, salts, metallic ores and metallic oxides. Specific examples include talc, titanium dioxide, mica, silica, silicates, carbon black, iron oxide, kaolin clay, titanium dioxide, calcium carbonate and aluminum oxide. These particulates can be found in a variety of applications such as coatings, plastics, rubbers, filtration products, cosmetics, food, paints, drilling mud and paper coatings.

According to the present invention, polysaccharides are selectively oxidized in an aqueous system using an oxidant with a nitroxyl radical mediator under defined conditions. The selectively oxidized polysaccharides have both carboxyl and aldehyde functional groups present, largely in the C6 position of the ASU. Once oxidized, they can then be converted into their lower molecular weight analogs as RFU ('ready-for-use') dispersions. For polysaccharides that are granular (e.g., granular starches), this degradation step occurs by an alkaline process that simultaneously disperses the oxidized polysaccharide while causing its degradation to lower molecular weights in a controlled manner. Optionally, these dispersions can be converted to CWS powders by spray or freeze-drying.

When the polysaccharide is starch, the starch base material useful in this invention can be any of a variety of starches, native or modified. These starches include those derived from any plant source, for example, corn, potato, sweet potato, wheat, rice, tapioca, waxy maize, sago, sorghum and high amylose starch (i.e., starch having at least 45% by weight of amylose content) such as high amylose corn. Starch flours can also be used as a starch source. Also included are conversion products derived from any of the former base, derivatized and crosslinked starches (e.g., dextrins prepared by the hydrolytic action of acid and/or heat; and fluidity or thin-boiling starches prepared by enzyme conversion or mild acid hydrolysis).

The starches can be modified with cationic, anionic, amphoteric, zwitterionic, hydrophobic and nonionic groups, as well as combinations of such groups. Modification of the starch can be carried out by well known chemical reactions with reagents containing groups such as amino, imino, ammonium, sulfonium or phosphonium groups as disclosed, for example, in MODIFIED STARCHES: PROPERTIES AND USES, (1986). Such derivatives include those containing nitrogen containing groups comprising primary, secondary, tertiary and quaternary amines, as well as sulfonium and phosphonium groups attached through either ether or ester linkages.

When the polysaccharide is a gum, applicable bases that can be used herein include polygalactomannans (heteropolysaccharides composed principally of long chains of β-D-mannopyranosyl units to which single unit side chains of α-D-galactopyranosyl units are joined). Also included are degraded gum products resulting from the hydrolytic action of acid, heat, shear and/or enzyme; oxidized gums; and derivatized gums. Suitable gum bases include guar, locust bean, tara and fenugreek gums.

Other suitable polysaccharide bases useful in the present invention include, for example, pullulan, chitin, chitosan, gum arabic, agar, algin, carrageenan, xanthan, gellan, welan, rhamsan, curdlan scleroglucan, tamarind gum, and hemicelluloses such as arabinogalactans and corn fiber gum and their derivatives.

When the polysaccharide is cellulose, applicable bases useful herein include cellulose and cellulose derivatives such as water soluble cellulose ethers (e.g., carboxymethylcellulose and alkyl and hydroxyalkylcelluloses such as methylcellulose, hydroxypropyl methylcellulose, hydroxyethyl cellulose, hydroxyethyl methylcellulose, hydroxybutyl methylcellulose, and ethyl hydroxyethyl cellulose).

Methods for preparing modified polysaccharide bases are well known to those skilled in the art and have been discussed in the literature. See, for example, R. L. Whistler, METHODS IN CARBOHYDRATE CHEMISTRY, Vol. IV, pp. 279-311 (1964); R. L. Whistler et al., STARCH CHEMISTRY AND TECHNOLOGY, Vol. II, pp. 293-430 (1967); R. L. Whistler and J. N. Bemiller, Eds., INDUSTRIAL GUMS, $3^{rd}$ Ed., Chpt. 3 (1993); R. L. Davidson and N. Sittig, WATER SOLUBLE RESINS, $2^{nd}$ Ed., Chpt. 2 (1968); and R. L. Davidson, HANDBOOK OF WATER SOLUBLE GUMS AND RESINS (1980).

As exemplified herein, polysaccharides can be first modified with one or more groups, such as sulfonates, phosphates and/or phosphonates, prior to oxidation. However, it should be understood that the polysaccharides can also be modified post-oxidation, for example, as described hereinafter.

Modified polysaccharides prepared according to the present invention are obtained by a selective oxidation process that is carried out in an aqueous system using an oxidant with a nitroxyl radical mediator under defined conditions. This process for the preparation of the modified polysaccharides compositions with carboxyl and aldehyde functional groups involves oxidizing the polysaccharide in an aqueous medium with an oxidant having an equivalent oxidizing power of up to 106.37 g active chlorine per mole of polysaccharide anhydrosugar unit ("ASU") and a mediating amount of nitroxyl radical. The reaction is carried out at a temperature of from about 5° C. to 50° C. and a pH of from about 6.0 to about 11.0. The resulting product has up to about 70 mole % carboxyl groups per mole of polysaccharide ASU and up to about 20 mole % aldehyde groups per mole of starch ASU.

When the polysaccharide is a starch, oxidation can be performed while the starch is in its granular state. The oxidized starch is then filtered and washed while still in the granular form to remove the nitroxyl mediator and the salt by-products formed as a result of the oxidation.

The oxidized polysaccharide then is controllably degraded by cooking the polysaccharide, forming an RFU dispersion of the lower molecular weight version of the modified polysaccharide with carboxyl and aldehyde functional groups. When the polysaccharide is an oxidized granular starch, this degradation is effected under alkaline conditions such that the starch is dispersed as it is degraded. Optionally, the resulting polysaccharide dispersion can be dried by spray drying or freeze drying to form a CWS RFU powder version of the lower molecular weight modified polysaccharide with carboxyl and aldehyde functional groups.

In another embodiment, a process for the preparation of the modified polysaccharide compositions with carboxyl and aldehyde functional groups involves modification of the polysaccharide by crosslinking it. For starches, it is beneficial if the crosslinking occurs while the starch is in the granular state. The crosslinked polysaccharide is then oxidized in an aqueous slurry with an oxidant having an equivalent oxidizing power of up to 106.37 g active chlorine per mole of polysaccharide anhydrosugar unit ("ASU") and a mediating amount of nitroxyl radical. The reaction is carried out at a temperature of from about 5° C. to about 50° C. and a pH of from about 6.0 to about 11.0. The resulting product can have up to about 70 mole % carboxyl groups per mole of polysaccharide ASU and up to about 20 mole % aldehyde groups per mole of polysaccharide ASU. Crosslinking can also occur after oxidation.

Once crosslinked and oxidized, the polysaccharide then is controllably degraded by cooking, forming an RFU dispersion of the lower molecular weight version of the modified polysaccharide with carboxyl and aldehyde functional groups. When the polysaccharide is a crosslinked, oxidized granular starch, it is filtered and washed while still in the granular form (i.e., prior to degradation) in order to remove the nitroxyl mediator and any salt by-products formed as a result of the oxidation. Degradation of the granular starch occurs under alkaline conditions. Optionally, the resulting dispersion can be dried by spray drying or freeze drying to form a CWS RFU powder version of the lower molecular weight modified starch with carboxyl and aldehyde functional groups.

The nitroxyl radical mediator used herein is a di-tertiary alkyl nitroxyl radical having one of the following formulas:

(I)

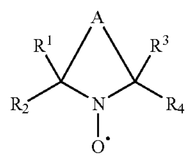

or (II)

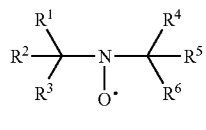

wherein A represents a chain of two or three atoms, for example, carbon atoms or a combination of one or two carbon atoms with an oxygen or nitrogen atom, and the R groups represent the same or different alkyl groups. Chain A can be substituted by one or more groups (e.g., alkyl, alkoxy, aryl, aryloxy, amino, amido or oxo groups), or by a divalent group or multivalent group which is bound to one or more other groups having formula I. Particularly useful nitroxyl radicals are di-tertiary alkyl nitroxyl radicals having the formula:

(III)

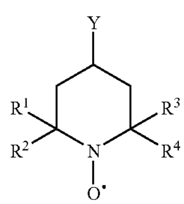

wherein Y is H, OH or NH—C(O)—$CH_3$ and each of the R groups represent the same or different alkyl groups of 1 to 18 carbon atoms. In one aspect, one or more of the R groups are methyl groups.

Nitroxyl radicals of this type include, for example, those where the R groups are all methyl (or alkyl of 1 carbon atom) and Y is H (i.e., 2,2,6,6-tetramethyl-1-piperdinyloxy (TEMPO)); the R groups are all methyl and Y is OH (identified as 4-hydroxy-TEMPO); and the R groups are all methyl and Y is NH—C(O)—$CH_3$ (identified as 4-acetamido-TEMPO). In one aspect, the nitroxyl radical is TEMPO or 4-acetamido-TEMPO.

The nitroxyl radical is used in an effective amount to mediate the oxidation. In one embodiment, about 0.001 to 20 mole % of the nitroxyl radical is used. In another embodiment, about 0.01 to 5 mole % of the nitroxyl radical is used based on moles of polysaccharide ASU. The nitroxyl radical can be added to the reaction mixture or generated in situ from the corresponding hydroxylamine or oxoammonium salts.

The oxidant used in this invention can be any material capable of converting nitroxyl radicals to their corresponding oxoammonium salt. These include the alkali or alkaline-earth metal hypohalite salts such as sodium hypochlorite, lithium hypochlorite, potassium hypochlorite and calcium hypochlorite. An alkali or alkaline-earth metal hypobromite salt can also be used. It can be added in the form of the hypobromite salt itself (e.g., sodium hypobromite), or it can be formed in situ from the addition of a suitable oxidant such as sodium hypochlorite and an alkali or alkaline-earth metal bromide salt.

Additional useful oxidants method include alkali or alkaline-earth metal chlorites or bromites such as sodium chlorite or sodium bromite, hydrogen peroxide in combination with a transition metal catalyst such as methyl trioxorhenium (VII); hydrogen peroxide in combination with an enzyme; oxygen in combination with a transition metal catalyst; oxygen in combination with an enzyme; peroxyacids such as peracetic acid and 3-chloroperoxybenzoic acid; alkali or alkaline-earth metal salts of persulfates such as potassium persulfate and sodium persulfate; alkali or alkaline-earth metal salts of peroxymonosulfates such as potassium peroxymonosulfate; chloramines such as 1,3,5-trichloro-1,3,5-triazine-2,4,6(1H,3H,5H)trione, 1,3-dichloro-1,3,5-triazine-2,4,6(1H,3H,5H) trione sodium salt, 1,3-dichloro-5,5-dimethylhydantoin, 1-bromo-3-chloro-5,5-dimethylhydantoin, and 1-chloro-2,5-pyrrolidinedione; and alkali or alkaline-earth metal salts of ferricyanide. This list of oxidants is only illustrative and is not intended to be exhaustive. Several oxidants can be used in combination at once or sequentially. The oxidants can be used alone or in combination with an alkali or alkaline-earth metal bromide salt. In one aspect the oxidant is sodium hypochlorite or sodium hypobromite formed from the addition of sodium hypochlorite and sodium bromide.

The oxidant should be used in an amount having an equivalent oxidizing power of up to 106.37 g active chlorine per mole of polysaccharide ASU. In one aspect the amount of oxidant used has an equivalent oxidizing power of from about 3.55 to about 99.27 g of active chlorine. In another aspect the amount of oxidant used has an equivalent oxidizing power of from about 3.55 to about 78.00 g of active chlorine. In even another aspect the amount of oxidant used has an equivalent oxidizing power of from about 3.55 to 63.82 g active chlorine. In another aspect the amount of oxidant used has an equivalent oxidizing power of from about 3.55 to about 49.63 g active chlorine per mole of polysaccharide ASU. In even another aspect the amount of oxidant used has an equivalent oxidizing power of from about 3.55 to about 24.82 g active chlorine per mole of polysaccharide ASU.

When sodium hypochlorite is used it can be added in an amount of up to about 150 mole percent based on moles of polysaccharide ASU. In one aspect sodium hypochlorite is used in an amount of from about 5 to 140 mole percent. In another aspect sodium hypochlorite is used in an amount of from about 5 to 110 mole percent. In even another aspect sodium hypochlorite is used in an amount of from about 5 to 90 mole percent. In one aspect sodium hypochlorite is used in an amount of from about 5 to about 70 mole percent based on moles of polysaccharide ASU. In another aspect sodium hypochlorite is used in an amount of from about 5 to 35 mole percent. By controlling both the amount of oxidant and its rate of addition under defined aqueous conditions, the generation of both carboxyl and the aldehyde functional groups, largely in the C6 position of the polysaccharide ASU, is ensured at effective levels.

Oxidation can be carried out in an organic or aqueous solution or in an aqueous slurry of the polysaccharide. This is accomplished by slow and controlled addition of the oxidant to the aqueous polysaccharide solution or slurry containing a mediating quantity of the nitroxyl radical so as to keep the reaction temperature below the maximum temperature of 50° C. In another aspect, the reaction temperature is kept in a temperature range of from about 5 to about 50° C. In even another aspect, the reaction temperature is kept in a temperature range of from about 10 to 30° C. The pH of the slurry is maintained between about 6 and about 11. In another aspect, the pH is maintained between about 8 and 10. The oxidant can be added as a hypochlorite or hypobromite (e.g., sodium hypochlorite or sodium hypobromite), or the hypobromite can be formed in situ by first adding sodium bromide and then adding the sodium hypochlorite solution to generate the hypobromite in situ.

The importance of carrying out selective oxidation of polysaccharides under the defined conditions of this invention is that oxidized polysaccharides are produced having both carboxyl and aldehyde functionalities. These products have carboxyl groups (largely in the C6 position of the polysaccharide ASU) in amounts of up to about 70 mole %. In one aspect, these products have carboxyl groups in amounts of from about 1 to about 70 mole %. In another aspect, these products have carboxyl groups in amounts of from about 2 to 50 mole % based on moles of polysaccharide ASU. In one aspect, these products have carboxyl groups in amounts of from about 2 to 40 mole % based on moles of polysaccharide ASU. In another aspect, these products have carboxyl groups in amounts of from about 2 to 30 mole % based on moles of polysaccharide ASU. In even another aspect, these products have carboxyl groups in amounts of from about 2 to 15 mole % based on moles of polysaccharide ASU. These products will also have aldehyde groups (largely in the C6 position of the polysaccharide ASU) in amounts of up to about 20 mole %. In one aspect these products will have aldehyde groups in amounts from about 1 to 15 mole % based on moles of polysaccharide ASU.

Oxidation can be carried out either in the heterogeneous state (slurry reaction) for water insoluble polysaccharides, or in the solution state for soluble polysaccharides. Slurry reactions are typically performed at up to 40% solids. In one aspect, slurry reactions are carried out at from about 0.1 to about 40% solids. In another aspect, slurry reactions are carried out at from about 20 to 40% solids. Homogeneous reactions are carried out at up to 30% solids. In one aspect, homogeneous actions are carried out at from about 0.1 to about 30% solids. In another aspect, homogeneous actions are carried out at from about 5 to about 20% solids.

When the polysaccharide used is starch, the starch can be oxidized in a granular or slurry state aqueous reaction. In this manner the starch granule remains intact throughout the oxidation reaction. This is further ensured if the starch is crosslinked prior to oxidation. When the reaction is complete the pH of the slurry is adjusted to at or below about 4. In one aspect the slurry pH is adjusted to be from about 3 to 4, during which time carboxylate groups are partially protonated to the carboxylic acids. The oxidized starch is then recovered by filtration and washed with water which removes the nitroxide mediator and salt by-products of the oxidation reaction. The oxidized starch can either be moved to the next step in the process in wet cake form, or dried for long term storage before proceeding to the next step in the process.

In one embodiment, the generation and presence of aldehyde groups in addition to carboxyl groups in oxidized polysaccharides provides an added benefit in the next step in the process. This step involves the simultaneous dispersion (usually by cooking) of the modified polysaccharide with carboxyl and aldehyde functional groups and degradation in a controlled manner to lower its molecular weight. (NOTE: The polysaccharide can already be dispersed prior to degradation, for example, when it is a water-soluble polysaccharide.) In this manner, an RFU version of the oxidized polysaccharide is generated while converting it to its lower molecular weight form, also essential for the end-use applications discussed herein. Moreover, the aldehyde groups also serve as useful reactive functional groups that, if desired, can be converted into other functional groups by reacting with reagents containing functionality capable of reacting with an aldehyde. More particularly, they can be further oxidized to generate additional carboxylic acid groups or reductively modified or reacted with reagents having aldehyde reactive functionality (e.g., hydroxyl, amino, amido, thiol, imido and sulfite groups or combinations thereof). This list of reagent groups is only illustrative and is not intended to be exhaustive. One particularly useful conversion of the aldehyde groups involves their reaction with bisulfite groups such as with sodium bisulfite or potassium bisulfite, resulting in what is commonly known as bisulfite adducts of aldehyde groups. The net result of this reaction is the effective conversion of all or some of the aldehyde functionality in the oxidized starches to sulfonate or sulfonic acid groups.

Oxidized polysaccharides according to this invention that are produced having both carboxyl and aldehyde functionality are controllably degraded by cooking under alkaline conditions, forming an RFU dispersion of the lower molecular weight version of the modified polysaccharide with carboxyl and aldehyde functional groups. This one-pot process is carried out at from 1 to 40 weight % of the modified polysaccharide with carboxyl and aldehyde functional groups in water. In another aspect, the process is carried out at from 5 to 30 weight %. The pH is adjusted to about 7 to about 12.5 using standard procedures. In one aspect, the pH is adjusted to about 9 to about 11. The temperature is adjusted to between about 40° C. and about 100° C. The mixture is agitated, for example by mechanical means, for anywhere from about 10 minutes to about 5 hours depending on pH, temperature and degree of conversion required. During this agitation process the pH can be re-adjusted as necessary.

Typically, during this stage of the process the oxidized polysaccharide swells (especially if the polysaccharide is an oxidized, granular starch), increasing the viscosity of the mixture, and then disperses while concurrently converting into lower molecular weights, finally resulting in a low viscosity solution. Conversion or controlled degradation of oxidized polysaccharides during this process is facilitated by alkali catalyzed degradation of the polysaccharide backbone at the aldehyde functional ASU's. Therefore, the presence and controlled generation of aldehyde groups in addition to carboxyl groups in the initial oxidation step of the overall process affects the conversion process, which in turn is critical for achieving the required molecular weights for the various end-use applications described herein. At the end of the prescribed period of dispersion and alkali treatment, the solution of converted modified polysaccharides with carboxyl and aldehyde functional groups is cooled down and, if necessary, adjusted to a pH of about 4 to 7.

This RFU solution of low molecular weight modified polysaccharide with carboxyl and aldehyde functional groups can be used directly in the end-use application. However, if required, it can also be freeze-dried or spray-dried to obtain a CWS powder form of the low molecular weight modified polysaccharide with carboxyl and aldehyde functional groups. Various methods of spray-drying are known and can be used in this invention. For example, U.S. Pat. No. 5,318, 635 describes useful spray-drying methods.

In another embodiment of this invention the two-step process of dispersing/converting and spray-drying of the modified starch with carboxyl and aldehyde functional groups is be carried out in a single step by continuous coupled jet-cooking/spray-drying as disclosed in U.S. Pat. No. 5,131,953. This process includes forming an alkaline slurry or a paste comprising the oxidized starch and water. The alkaline aqueous slurry or paste is jet cooked with steam at a temperature sufficient to fully disperse or solubilize and convert the oxidized starch. This jet-cooked dispersion or solution is conveyed and introduced under high temperature and pressure into a nozzle of the spray-dryer. The jet-cooked dispersion or solution is then atomized through the nozzle of the spray-dryer and dried within the spray-dryer chamber. The jet-cooked and spray-dried low molecular weight modified polysaccharide with carboxyl and aldehyde functional groups is then recovered as a CWS powder.

Another useful spray-drying technique is the steam-injection/dual and single atomization processes as described in U.S. Pat. Nos. 4,280,851, 4,600,472 and 5,149,799. The temperature and pressure conditions used in the spray-drying operation can vary depending on the particular polysaccharide material being used. Typically, the temperature will vary from about 80 to 220° C. and the pressure from about 20 to 150 psig.

Water Treatment Systems

Industrial water treatment includes prevention of calcium scales due to precipitation of calcium salts such as calcium carbonate, calcium sulfate and calcium phosphate. These salts are inversely soluble, meaning that their solubility decreases as the temperature increases. For industrial applications where higher temperatures and higher concentrations of salts are present, this usually translates to precipitation occurring at the heat transfer surfaces. The precipitating salts can then deposit onto the surface, resulting in a layer of calcium scale. The calcium scale can lead to heat transfer loss in the system and cause overheating of production processes. This scaling can also promote localized corrosion.

Calcium phosphate, unlike calcium carbonate, generally is not a naturally occurring problem. However, orthophosphates are commonly added to industrial systems (and sometimes to municipal water systems) as a corrosion inhibitor for ferrous metals, typically at levels between 2.0-20.0 mg/L. Therefore, calcium phosphate precipitation can not only result in those scaling problems previously discussed, but can also result in severe corrosion problems as the orthophosphate is removed from solution. As a consequence, industrial cooling systems require periodic maintenance wherein the system must be shut down, cleaned and the water replaced. Lengthening the time between maintenance shutdowns saves costs and is desirable.

It is advantageous to reuse the water in industrial water treatment systems as much as possible. Still, water can be lost over time due to various mechanisms, e.g., evaporation. As a consequence, dissolved and suspended solids become more concentrated over time. Cycles of concentration refers to the number of times solids in a particular volume of water are concentrated. The quality of the makeup water determines how many cycles of concentration can be tolerated. In cooling tower applications where makeup water is hard (i.e., poor quality), 2 to 4 cycles would be considered normal, while 5 and above would represent stressed conditions. Modified polysaccharide polymers according to the present invention perform particularly well under stressed conditions.

One way to lengthen the time between maintenance in a water treatment system is by use of polymers that function in either inhibiting formation of calcium salts or in modifying crystal growth. Crystal growth modifying polymers alter the crystal morphology from regular structures, e.g., cubic, to irregular structures such as needlelike or florets. Because of the change in form, crystals that are deposited are easily removed from the surface simply by mechanical agitation resulting from water flowing past the surface. Modified polysaccharides according to the present invention are particularly useful at inhibiting calcium phosphate based scale formation such as calcium orthophosphate. Further, these inventive polysaccharides also modify crystal growth of calcium carbonate scale. Modified polysaccharides according to the present invention have been found to be particularly useful in minimizing scale by dispersion, as well as by crystal growth modification.

The modified polysaccharide polymers of the present invention can be added to the aqueous systems neat, or they can be formulated into various water treatment compositions and then added to the aqueous systems. In certain aqueous systems where large volumes of water are continuously treated to maintain low levels of deposited matter, the polymers can be used at levels as low as 0.5 mg/L. The upper limit on the amount of polysaccharide used depends upon the particular aqueous system treated. For example, when used to disperse particulate matter the polysaccharide can be used at levels ranging from about 0.5 to about 2000 mg/L. When used to inhibit the formation or deposition of mineral scale the polymer can be used at levels ranging from about 0.5 to about 100 mg/L, in another embodiment from about 3 to about 20 mg/L, and in another embodiment from about 5 to about 10 mg/L.

Once prepared, the modified polysaccharides can be incorporated into a water treatment composition that includes these polysaccharides and other water treatment chemicals. These other chemicals can include, e.g., corrosion inhibitors such as orthophosphates, zinc compounds and tolyltriazole. As indicated above, the amount of inventive polymer utilized in the water treatment compositions varies based upon the treatment level desired for the particular aqueous system treated. Water treatment compositions generally contain from about 10 to about 25 percent by weight of the modified polysaccharide.

The modified polysaccharides can be used in any aqueous system wherein stabilization of mineral salts is important, such as in heat transfer devices, boilers, secondary oil recovery wells, automatic dishwashers, and substrates that are washed with hard water. The modified polysaccharides are especially effective under stressed conditions in which other scale inhibitors fail.

The modified polysaccharides polymers can stabilize many minerals found in water, including, but not limited to, iron, zinc, phosphonate, and manganese. The polymers also disperse particulate found in aqueous systems.

Modified polysaccharide polymers according to the present invention can be used to inhibit scales, stabilize minerals and disperse particulates in many types of processes. Examples of such processes include sugar mill anti-scalant; soil conditioning; treatment of water for use in industrial processes such as mining, oilfields, pulp and paper production, and other similar processes; waste water treatment; ground water remediation; water purification by processes such as reverse osmosis and desalination; air-washer systems; corrosion inhibition; boiler water treatment; as a biodispersant; and chemical cleaning of scale and corrosion deposits. One skilled in the art can conceive of many other similar applications for which the modified polysaccharides could be useful.

Cleaning Formulations

The modified polysaccharides of this invention can also be used in a wide variety of cleaning formulations containing phosphate-based builders. For example, these formulations can be in the form of a powder, liquid or unit doses such as tablets or capsules. Further, these formulations can be used to clean a variety of substrates such as clothes, dishes, and hard surfaces such as bathroom and kitchen surfaces. The formulations can also be used to clean surfaces in industrial and institutional cleaning applications.

In cleaning formulations, the modified polymers can be diluted in the wash liquor to the end use level. The modified polysaccharides are typically dosed at 0.01 to 1000 ppm in the aqueous wash solutions. These polymers can minimize deposition of phosphate based scale in fabric, dishwash and hard surface cleaning applications. The polymers also help in minimizing encrustation on fabrics. Additionally, the polysaccharide polymers minimize filming and spotting on dishes. Dishes can include glass, plastics, china, cutlery, etc.

Optional components in the detergent formulations include, but are not limited to, ion exchangers, alkalies, anti-corrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers. These optional components may comprise up to about 90 weight % of the detergent formulation.

The modified polysaccharides of this invention can be incorporated into hand dish, autodish and hard surface cleaning formulations. These polymers can also be incorporated into rinse aid formulations used in autodish formulations. Autodish formulations can contain a variety of ingredients, including builders such as phosphates and carbonates, bleaches and bleach activators, and silicates. These formulations can also include enzymes, buffers, perfumes, anti-foam agents, processing aids, and so forth. Autodish gel systems containing hypochlorite bleach are particularly hard on polymers due to the high pH required to maintain bleach stability.

Hard surface cleaning formulations can contain other adjunct ingredients and carriers. Examples of adjunct ingredients include, without limitation, buffers, builders, chelants, filler salts, dispersants, enzymes, enzyme boosters, perfumes, thickeners, clays, solvents, surfactants and mixtures thereof.

One skilled in the art will recognize that the amount of modified polysaccharide polymer(s) required depends upon the cleaning formulation and the benefit they provide to the formulation. In one aspect, use levels can be about 0.01 weight % to about 10 weight % of the cleaning formulation. In another embodiment, use levels can be about 0.1 weight % to about 2 weight % of the cleaning formulation.

Oilfield Scale Application

Scale formation is a major problem in oilfield applications. Subterranean oil recovery operations can involve the injection of an aqueous solution into the oil formation to help move the oil through the formation and to maintain the pressure in the reservoir as fluids are being removed. The injected water, either surface water (lake or river) or seawater (for operations offshore) can contain soluble salts such as sulfates and carbonates. These salts tend to be incompatible with ions already present in the oil-containing reservoir (formation water). The formation water can contain high concentrations of certain ions that are encountered at much lower levels in normal surface water, such as strontium, barium, zinc and calcium. Partially soluble inorganic salts, such as barium sulfate and calcium carbonate, often precipitate from the production water as conditions affecting solubility, such as temperature and pressure, change within the producing well bores and topsides. This is especially prevalent when incompatible waters are encountered such as formation water, seawater, or produced water.

Barium sulfate and strontium sulfate form very hard, very insoluble scales that are difficult to prevent. Barium sulfate or other inorganic supersaturated salts can precipitate onto the formation forming scale, thereby clogging the formation and restricting the recovery of oil from the reservoir. The insoluble salts can also precipitate onto production tubing surfaces and associated extraction equipment, limiting productivity, production efficiency and compromising safety. Certain oil-containing formation waters are known to contain high barium concentrations of 400 ppm, and higher. Since barium sulfate forms a particularly insoluble salt, the solubility of which declines rapidly with temperature, it is difficult to inhibit scale formation and to prevent plugging of the oil formation and topside processes and safety equipment.

Dissolution of sulfate scales is difficult, requiring high pH, long contact times, heat and circulation, and can only be performed topside. Alternatively, milling and in some cases high-pressure water washing can be used. These are expensive, invasive procedures and require process shutdown. The modified polysaccharides of this invention can minimize sulfate scales, especially downhole sulfate scales.

Dispersant for Particulates

Modified polysaccharides according to the present invention can be used as a dispersant for pigments in applications such as paper coatings, paints and other coating applications. Examples of pigments that can be dispersed by the inventive polymers include titanium dioxide, kaolin clays, modified kaolin clays, calcium carbonates and synthetic calcium carbonates, iron oxides, carbon black, talc, mica, silica, silicates, and aluminum oxide. Typically, the more hydrophobic the pigment the better polymers according to the present invention perform in dispersing particulates. These particulate matters are found in a variety of applications, including but not limited to, coatings, plastics, rubbers, filtration products, cosmetics, food, paints, drilling mud and paper coatings.

Fiberglass Sizing

Fiberglass is usually sized with phenol-formaldehyde resins or polyacrylic acid based resins. The former has the disadvantage of releasing formaldehyde during end use. The polyacrylic acid resin system has become uneconomical due to rising crude oil prices. Hence, there is a need for renewable sizing materials in this industry. The modified polysaccharides of this invention are a good fit for this application. They can be used by themselves or in conjunction with the phenol formaldehyde or polyacrylic acid binder system.

The binder composition is generally applied to a fiber glass mat as it is being formed by means of a suitable spray applicator. The spray applicator aids in distributing the binder solution evenly throughout the formed fiberglass mat. Solids are typically present in the aqueous solution in amounts of about 5 to 25 percent by weight of total solution. The binder may also be applied by other means known in the art, including, but not limited to, airless spray, air spray, padding, saturating, and roll coating.

Residual heat from the fibers volatizes water away from the binder. The resultant high-solids binder-coated fiberglass mat is allowed to expand vertically due to the resiliency of the glass fibers. The fiberglass mat is then heated to cure the binder. Typically, curing ovens operate at a temperature of from 130° C. to 325° C. However, the binder composition of the present invention can be cured at lower temperatures of from about 110° C. to about 150° C. In one aspect, the binder composition can be cured at about 120° C. The fiberglass mat is typically cured from about 5 seconds to about 15 minutes. In one aspect the fiberglass mat is cured from about 30 seconds to about 3 minutes. The cure temperature and cure time also depend on both the temperature and level of catalyst used. The fiberglass mat can then be compressed for shipping. An important property of the fiberglass mat is that it returns substantially to its full vertical height once the compression is removed. The modified polysaccharide based binder produces a flexible film that allows the fiberglass insulation to bounce back after one unwraps the roll and uses it in walls/ceilings.

Fiberglass or other non-woven treated with the copolymer binder composition is useful as insulation for heat or sound in the form of rolls or batts; as a reinforcing mat for roofing and flooring products, ceiling tiles, flooring tiles, as a microglass-based substrate for printed circuit boards and battery separators; for filter stock and tape stock and for reinforcements in both non-cementatious and cementatious masonry coatings.

The following examples are intended to exemplify the present invention but are not intended to limit the scope of the invention in any way. The breadth and scope of the invention are to be limited solely by the claims appended hereto.

EXAMPLE 1

Oxidation of High Amylose Starch

High amylose starch (HYLON® VII starch, available from National Starch and Chemical Company, Bridgewater, N.J.) was oxidized in aqueous conditions using a jacketed beaker equipped with an overhead stirrer using the following procedure The nitroxyl radical, 4-acetamido-TEMPO (0.79 g; 0.2 mol % based on moles of starch ASU) and sodium bromide (9.52 g; 5 mol %) were added to an aqueous slurry of high amylose starch (344 g (300 g dry; 1.85 mole ASU) in 500 mL water). The system was cooled to below 10° C. with a water circulator and the pH of the slurry was adjusted to 9.0 with sodium hydroxide (2.5 M solution). Sodium hypochlorite (1090.5 g; 11.4% solution; 90 mol %) was then introduced into the reaction mixture by dropwise addition at a rate so as to maintain the temperature of the reaction mixture <15° C. The pH of the slurry was held constant at 9.0 through this addition process by the addition of 2.5 M sodium hydroxide solution using a Brinkmann Metrohm 718 STAT Titrino (pH-stat). The oxidation was essentially complete once all of the hypochlorite solution was added and the pH of the system had stabilized. At this point, the reaction was quenched by scavenging the remaining trace quantities of hypochlorite by adding ascorbic acid (10 g). Finally, the pH of the mixture was lowered to about 3.5 with hydrochloric acid. The oxidized starch product was then filtered and washed with water at pH of about 3.5 (4 L) and air dried in a low humidity environment.

Determination of Aldehyde Content of Oxidized HYLON® VII Starch:

Aldehyde content of oxidized starch was determined using hydroxylamine hydrochloride titration via oxime derivatization according to the following reaction and procedure $$RCHO + NH_2OH \cdot HCl \rightarrow RCHNOH + HCl$$

The oxidized starch was slurried in water (1.223 g in 50 mL water) and its pH was adjusted to 4 with aqueous HCl. To this stirred solution, a large excess of an aqueous solution of 2.0 M hydroxylamine hydrochloride, also at pH 4, (approximately 3 mL) was added rapidly all at once. During the reaction, the pH of the mixture was maintained at 4 via titration with a 0.1 N NaOH solution using a pH stat. This was continued until no further reduction in pH of the solution could be detected.

The aldehyde content of the oxidized starch sample described above was calculated to be 14.5 mol % based on moles of starch ASU by total consumption of NaOH (10.93 mL) using the following equation:

$$\mathrm{mol\,\%\,CHO} = \frac{(\mathrm{mL\ of\ NaOH\ titrant} \times \mathrm{N\ of\ NaOH})/1000}{\mathrm{moles\ of\ starch\ } ASU} \times 100$$

Determination of Carboxylic Acid Content of Oxidized HYLON® VII Starch:

Carboxylic acid formed during the oxidation was estimated from the remainder of oxidant not consumed for aldehyde generation, which in the case of this Example was approximately 38 mol % per starch ASU. This was also confirmed by $^{13}$C NMR spectrum of the oxidized starch taken from $D_2O$ solution, which indicated approximately 38 mole % per starch ASU C6 carboxyl content.

EXAMPLE 2

Oxidation of Waxy Maize Starch

Waxy maize starch (AMIOCA™ starch, available from National Starch and Chemical Company, Bridgewater, N.J.) was oxidized using the procedure described in Example 1. The oxidized waxy maize product was somewhat more swollen than the corresponding HYLON® VII described in Example 1, and hence was also washed with ethanol following its filtration and water washing. It was finally air dried in a low humidity environment.

The aldehyde content of the oxidized waxy maize starch was determined as described in Example 1 and was calculated to be 12.0 mol % based on moles of starch ASU.

The carboxylic acid formed during the oxidation was estimated from the remainder of the oxidant that was not consumed for aldehyde generation, which for this example was approximately 39 mol % per starch ASU. This was also confirmed by $^{13}$C NMR spectrum of the oxidized starch taken from $D_2O$ solution, which indicated approximately 39 mol % per starch ASU C6 carboxyl content.

EXAMPLE 3

Oxidation of Waxy Maize Starch

Waxy maize starch (AMIOCA™ starch, available from National Starch and Chemical Company, Bridgewater, N.J.) was oxidized and recovered using a procedure similar to that described in Example 1 with the exception that the sodium hypochlorite oxidant was limited to 560 g of 8.2% solution, or 50 mol % starch ASU. The carboxylic acid formed during oxidation was determined to be (based on 2.5M NaOH consumption used to maintain the pH throughout oxidation) approximately 18 mol % per starch ASU.

EXAMPLE 4

Oxidation of Crosslinked Corn Starch

Crosslinked corn starch (VULCA® 90 starch, available from National Starch and Chemical Company, Bridgewater, N.J.) was oxidized and recovered using the procedure described in Example 1. The aldehyde content of the oxidized VULCA® 90 starch was determined as described in Example 1 and was calculated to be 15.1 mol % based on moles of starch ASU.

Carboxylic acid formed during oxidation was estimated from the remainder of oxidant not consumed for aldehyde generation, which for this example was approximately 37 mole % per starch ASU. This was also confirmed by $^{13}$C NMR spectrum of the oxidized starch taken from $D_2O$ solution, which indicated approximately 40 mole % per starch ASU C6 carboxyl content.

EXAMPLE 5

Oxidation of Starch Modified with 3-chloro-2-hydroxy-1-propanesulfonic Acid

Waxy maize starch (AMIOCA™ starch, available from National Starch and Chemical Company, Bridgewater, N.J.) (350 grams) was slurried in 525 ml of water at 40° C. The pH of the mixture was raised to 11.5-11.7 with the slow addition of aqueous sodium hydroxide (3%), followed by addition of 3-chloro-2-hyhdroxy-1-propane sulfonic acid sodium salt (7% by weight of the starch) (available from Sigma-Aldrich Co., St. Louis, Mo.). Additional aqueous sodium hydroxide (3%) was then added to readjust the pH of the slurry to 11.5-11.7. After running the reaction at 40° C. for 6 hours, 10% aqueous hydrochloric acid solution was added to lower the slurry pH to the 5-6 range. The modified starch was then filtered and washed with water. The filter cake of the modified starch was then re-slurried in water and oxidized according to the procedure described in Example 1.

EXAMPLE 6

Oxidation of Phosphorylated Starch

Waxy maize starch (AMIOCA™ starch, available from National Starch and Chemical Company, Bridgewater, N.J.) was first phosphorylated with an alkali metal tripolyphosphate salt as described in U.S. Pat. No. 4,166,173. The starch was then oxidized according to the procedure described in Example 1.

EXAMPLE 7

Simultaneous Cooking and Conversion of Oxidized Starches

The oxidized starches of Examples 1-3 were simultaneously dispersed and converted to their lower molecular weight analogs in a one-pot procedure using one of the following two methods Method 7(a)—About 35 g of the oxidized starch (30 g dry basis) was dispersed in 1200 mL water. The pH of the slurry was adjusted to a pre-determined value in a 6.0-12.5 range using a 2.5 M NaOH solution. The slurry was then heated in a steam bath (90-95° C.) with vigorous mechanical agitation for 20-30 minutes. During this heating period the starches first cooks (evidenced by the rapid swelling and viscosity increase of the solutions) and then concurrently and rapidly converts into a low viscosity solution. The degree of conversion was determined by adjusting the pH of each slurry and their cooking time. Once converted to the desired degree, the solutions were cooled down to room temperature and, if needed, their pH's lowered to the 4-5 range. Converted low molecular weight oxidized polysaccharides were then recovered by freeze drying.

Method 7(b)—About 60 g of the oxidized starch (55 g dry basis) was dispersed in 1200 mL water. The pH of the slurry was adjusted to 10.5 with 2.5 M NaOH solution, and the temperature of the slurry was then raised to 60° C. The mechanically stirred mixture was treated at this temperature for a period of time while its pH was maintained at 10.5 with 2.5 M NaOH with a Brinkmann Metrohm 718 STAT Titrino (pH-stat). In a manner similar to above process, the slurry of the polysaccharide first slowly swells and disperses while converting to lower molecular weights, resulting in a low viscosity solution. At the end of the treatment period, the solutions were cooled down to room temperature and their pH lowered to the 4-5 range. Converted low molecular weight oxidized starches were then recovered by freeze drying. Table 1 summarizes the cooking conditions and the properties of the converted oxidized starches.

TABLE I

Simultaneous cooking and conversion of oxidized starches

| Converted Starch | Base Starch | Slurry pH | Cooking Time (min) | Mw[3] | Mn[3] | Mw/Mn |
|---|---|---|---|---|---|---|
| 7H1[1] | Oxidized HYLON VII (Example 1) | 11.0 | 20 | 53302 | 6771 | 7.9 |
| 7H2[2] | Oxidized HYLON VII (Example 1) | 10.5 | 90 | 39926 | 7523 | 5.3 |
| 7A1[1] | Oxidized AMIOCA (Example 2) | 6.5 | 30 | — | — | — |
| 7A2[1] | Oxidized AMIOCA (Example 2) | 10.0 | 30 | — | — | — |
| 7A3[1] | Oxidized AMIOCA (Example 2) | 11.3 | 30 | 249315 | 10331 | 24.1 |
| 7A4[2] | Oxidized AMIOCA (Example 2) | 10.5 | 60 | 20196 | 4802 | 4.2 |
| 7V1[1] | Oxidized VULCA 90 (Example 4) | 11.7 | 30 | 310387 | 7991 | 39.2 |
| 7V2[1] | Oxidized VULCA 90 (Example 4) | 12.4 | 30 | 70243 | 5934 | 11.8 |
| 7V3[2] | Oxidized VULCA 90 (Example 4) | 10.5 | 120 | 14412 | 4629 | 3.1 |

[1]Method 7(a).
[2]Method 7(b).
[3]'Mw' is weight average molecular weight. 'Mn' is number average molecular weight. Determined by size exclusion chromatography in water using low molecular weight standards.

EXAMPLE 8

Oxidation and Conversion of Pullulan

Pullulan (available from Spectrum Chemicals & Laboratory Products, New Brunswick, N.J.) was sequentially oxidized and converted to its lower molecular weight analog in a one-pot homogeneous process as follows. An aqueous solution (approximately 250 g) containing 27.5 g pullulan (0.170 mol pullulan ASU), 0.049 g 4-acetamido-TEMPO and 9.52 g sodium bromide was prepared at room temperature and its pH was raised to 9.5 with 1 M sodium hydroxide solution. 14.8 g sodium hypochlorite (11.5% solution; 13.4 mol % per pullulan ASU) was then introduced to the vigorously stirred solution dropwise at a rate so as to maintain the temperature of the reaction mixture in 20-25° C. range. The pH of the solution was held constant at 9.5 through the addition process with 1 M NaOH solution using a Brinkmann Metrohm 718 STAT Titrino (pH-stat). Oxidation was complete once all of the hypochlorite solution had been added and the pH of the system had stabilized at 9.5. A small aliquot of the solution (approximately 20 g) was removed at this stage for aldehyde and carboxyl content analysis, which were determined as 5.1 mol % and 4.2 mol % per pullulan ASU, respectively (as described in Example 1).

The pH of the solution was then slowly raised to 10 and maintained at this level at room temperature for 90 minutes, during which a clearly visible reduction in its viscosity took place. Finally, the pH was lowered to 4 with aqueous hydrochloric acid and the oxidized and converted pullulan was recovered by precipitation into ethanol.

The number average molecular weight of the oxidized and converted pullulan at the end of this sequential process was estimated from NMR spectroscopy to be about 13500.

EXAMPLE 9

Procedure for Evaluating Oxidized Starches for Anti-Encrustation Properties in Commercial Laundry Detergent Formulations Black cotton interlock fabric available from Test Fabrics Inc. was cut into 17.8 cm×17.8 cm (7"×7") swatches. A total of 40 grams (+/−0.2 g) of swatches was weighed for each test (which is conducted in a tergitometer), trimming one of the swatches in each test as necessary to obtain the desired weight.

1 L of water having a hardness (Ca:Mg=2:1) of 150 ppm as calcium carbonate was added to each tergitometer. 1.24 g of TIDE® powder detergent and 0.9 g of powder bleach was weighed into disposable weigh boats. A specified amount of polymer was also weighed into weigh boats (typically 4% dry/detergent weight). A control sample was also prepared without any polymer.

The detergent and polymer were added to the tergitometer pots, and the water was agitated for 30 seconds to homogenize the wash water. The fabric was then added to the pots and washed for 10 minutes. During the wash cycle, the water temperature was approximately 93° F., wash time approximately 10 minutes, rinse time approximately 5 minutes, and agitator speed approximately 80-100 rpm.

At the completion of the wash cycle the tergitometer pots were drained, with 1 L of the water described above used to rinse the swatches for 5 minutes. The swatches were then dried in a tumble dryer on high heat for 20 minutes. The above wash steps were repeated for a total of 5 wash/dry cycles.

Three separate swatches from each tergitometer pot were cut into 5.1 cm×5.1 cm (2"×2") swatches. Each swatch was weighed on an analytical balance and placed in a labeled specimen cup. Each small swatch was placed into 20 grams of 10% nitric acid, agitating slightly for 1 minute to dissolve the $CaCO_3$ on the swatch. The nitric acid was then decanted into a graduated cylinder. The swatches were rinsed twice more with deionized water, decanting the water into the cylinder after each rinse. 1 ml of 12% KCl solution was added to the cylinder, followed by the addition of deionized water to make up a volume of 200 ml. 30-50 ml of the solution was filtered to remove fibers, and each sample then poured into a labeled container and the ppm calcium was determined using atomic absorption spectroscopy.

Percent $CaCO_3$ was determined according to the following formula $$\text{Wt. \% CaCO}_3 = \frac{ppm\ Ca \times X}{40 \times (\text{wt. of swatch})}$$

wherein X is the dilution of solution after nitric acid wash (2 in this case).

The test results are summarized in Table II below

TABLE II

Percent $CaCO_3$ Retained on Fabric

| Sample | Dosage | Wt % $CaCO_3$ on fabric |
| --- | --- | --- |
| Control | — | 0.9771 |
| Alcosperse 602N | 1% | 0.8529 |
| Example 7H1 | 1% | 0.8882 |
| Example 7A3 | 1% | 0.7534 |
| Example 7V2 | 1% | 0.8656 |

The test results in Table II above illustrate that fabrics washed with detergent compositions containing the oxidized starches of the present invention have equal to or less calcium carbonate deposited on the fabric than detergents containing the synthetic polymer polyacrylic acid (ALCOSPERSE® 602N detergent additive, available from Alco Chemical, Chattanooga, Tenn.).

The calcium binding/sequestration of polymers according to the present invention was measured using a standard titration procedure. The results are provided in Table III below

TABLE III

Calcium Binding/Sequestration

| Sample | Calcium binding - mg CaCO3/g polymer |
| --- | --- |
| ALCOSPERSE ® 602N detergent additive | 300.0 |
| Example 7H1 | 17.49 |
| Example 7A1 | 0 |
| Example 7A3 | 0 |
| Example 7V2 | 0 |

The above Table III data indicates that modified polysaccharides according to the present invention have little or no calcium sequestration properties. This result is completely opposite to calcium binding properties of oxidized starches reported in literature (see, for example, Example II and Table A of U.S. Pat. No. 5,326,864). Oxidized starches taught in the prior art (such as those of the '864 patent) have excellent calcium binding properties. In contrast, the modified polysaccharides according to the present invention have excellent anti-encrustation properties (i.e., prevention of $CaCO_3$ build-up on fabric). This can only be attributed to a crystal growth modification or a dispersancy mechanism. In fact, the anti-encrustation properties of some of the inventive polymers are better than the synthetic polyacrylic acid homopolymer (ALCOSPERSE® 602N). Therefore, the composition and performance of these inventive polymers is different and novel from those disclosed in the prior art.

EXAMPLE 10

Evaluation of Polymers of this Invention in a Standard Nace Test for Calcium Carbonate Inhibition

TABLE IV

% CaCO₃ Inhibition of Polymers

| Sample | Amount of sample used in the test (ppm) | % CaCO$_3$ inhibition |
| --- | --- | --- |
| Control (no polymer) | — | 0 |
| Example 7A1 | 100 | 13.9 |
| Example 7A2 | 100 | 14.5 |
| Example 7A3 | 100 | 14.7 |
| AQUATREAT ® 900A polymer* (polyacrylic acid homopolymer) | 20 | 80.0 |

*available from Alco Chemical, Chattanooga, Tennessee

The above data would seem to indicate that polymers according to the present invention are not good at inhibiting calcium carbonate scale as measured by laboratory beaker test, despite being tested at 5 times the level of a typical synthetic polymer. This illustrates that the modified polysaccharides of the present invention are not good calcium sequestration agents. However, as seen in Example 1 above, they have excellent encrustation properties. Therefore, these materials (in contrast to those cited in literature) prevent carbonate scale by means of a crystal growth or dispersion mechanism.

EXAMPLE 11

Soil Anti-Redeposition

The oxidized starches were tested for anti-redeposition properties in a generically built liquid detergent formulation. The formulation of the generically built liquid detergent is as follows

| Ingredient | wt % |
| --- | --- |
| DI water | 37.25 |
| Sodium citrate | 9.0 |
| Propylene glycol | 8.0 |
| 40% Sodium xylene sulfonate | 18.75 |
| BIOSOFT ™ D-40 anionic surfactant (available from Stepan Chemical Co., Northfield, Illinois) | 20.00 |
| NEODOL ® 25-9 detergent alcohol (available from Shell, Houston, Texas) | 7.0 |

Testing was conducted in a full scale washing machine using 3 cotton and 3 polyester/cotton swatches. The soil used was a blend of rose clay (17.5 g), bandy black clay (17.5 g) and oil (6.9 g, 75:25 vegetable/mineral). The test was conducted for 3 cycles using 100 g of liquid detergent per wash load. The oxidized starches were dosed in at 2 weight % of the detergent, and the polyacrylic acid (ALCOSPERSE® 602N detergent additive from Alco Chemical) was dosed at 0.5%. Wash conditions used were a temperature of 34° C. (93° F.), 150 ppm hardness and a 10 minute wash cycle.

TABLE V

Soil Anti-Redeposition

| Sample | Delta E ('ΔE') Cotton | Delta E ('ΔE') Poly/cotton |
| --- | --- | --- |
| Blank | 1.73 | 1.54 |
| ALCOSPERSE ® 602N | 0.37 | 0.39 |
| Example 7A1 | 0.71 | 0.55 |
| Example 7A2 | 0.47 | 0.49 |
| Example 7A3 | 0.42 | 0.51 |
| Example 7H1 | 0.56 | 0.43 |
| Example 7V1 | 0.78 | 0.78 |
| Example 7V2 | 0.53 | 0.57 |

L a b values before the first cycle and after the third cycle were measured as $L_1$, $a_1$, $b_1$ and $L_2$, $a_2$, $b_2$, respectively, using a spectrophotometer. ΔE values were then calculated using the following equation $$\Delta E = [(L_1 - L_2)^2 + (a_1 - a_2)^2 + (b_1 - b_2)^2]^{0.5}$$

The data indicates that the oxidized starches have similar anti-redeposition/soil suspension properties to the polyacrylic acid sample (a lower ΔE indicate better anti-redeposition).

EXAMPLE 12

Soil Anti-Redeposition

The oxidized starch of Example 7H1 was tested for anti-redeposition properties in a generically built liquid detergent formulation at different levels of active. The formulation of the generically built liquid detergent was the same as in Example 11 above.

The test was conducted in a full scale washing machine using 3 cotton and 3 polyester/cotton swatches. The soil used was 17.5 g rose clay, 17.5 g bandy black clay and 6.9 g oil blend (75:25 vegetable/mineral). The test was conducted for 3 cycles using 100 g liquid detergent per wash load. The oxidized starches were dosed in at 0.5, 1.0 and 1.5 weight % of the detergent. The wash conditions used a temperature of 34° C. (93° F.), 150 ppm hardness and a 10 minute wash cycle.

TABLE VI

| % Active of Example 7H1 | Delta E ('ΔE') Cotton | Delta E ('ΔE') Poly/cotton |
| --- | --- | --- |
| Blank | 1.73 | 1.54 |
| 2.0 | 0.56 | 0.43 |
| 1.0 | 0.56 | 0.50 |
| 0.5 | 0.63 | 0.57 |

The L a b values before the first cycle and after the third cycle were measured as $L_1$, $a_1$, $b_1$ and $L_2$, $a_2$, $b_2$, respectively, using a spectrophotometer. The ΔE values were then calculated using the following equation $$\Delta E = [(L_1 - L_2)^2 + (a_1 - a_2)^2 + (b_1 - b_2)^2]^{0.5}$$

The data indicate that oxidized starches according to the present invention show anti-redeposition/soil suspension properties even at low concentrations in the wash liquor (lower ΔE indicates better anti-redeposition).

EXAMPLE 13

Dispersion

Oxidized starches according to the present invention were tested for dispersancy performance. 2% solutions of clay in water (50:50 rose clay/black clay) and 0.1% polymer slurries were introduced into graduated cylinders. Snapshots of the slurries (found in FIG. 1) were taken at periodic intervals. The data indicates that lower molecular weight oxidized starches (Examples 7A3, 7H1 and 7V2) are as good a dispersant as polyacrylic acid.

Formulation Examples

The following examples illustrate various formulations having modified polysaccharides polymer according to the present invention for use in different aqueous systems

EXAMPLE 14

Automatic Phosphated Dishwash Powder Formulation

| Ingredients | wt % |
| --- | --- |
| Sodium tripolyphosphate | 25.0 |
| Sodium carbonate | 25.0 |
| C12-15 linear alcohol ethoxylate with 7 moles of EO | 3.0 |
| Polymer of Example 7V1 | 14.0 |
| Sodium sulfate | 33.0 |

EXAMPLE 15

Automatic Non-Phosphated Dishwash Powder Formulation

| Ingredients | wt % |
| --- | --- |
| Sodium citrate | 30 |
| Polymer of Example 7A2 | 10 |
| Sodium disilicate | 10 |
| Perborate monohydrate | 6 |
| Tetra-acetylethylenediamine | 2 |

EXAMPLE 16

Handwash Fabric Detergent

| Ingredients | wt % |
| --- | --- |
| Linear alkylbenzene sulfonate | 15-30 |
| Nonionic surfactant | 0-3 |
| Na tripolyphosphate (STPP) | 3-20 |
| Na silicate | 5-10 |
| Na sulfate | 20-50 |
| Bentonite clay/calcite | 0-15 |
| Polymer Example 7A3 | 1-10 |
| Enzymes | 2 |
| Water | Balance |

EXAMPLE 17

Fabric Detergent with Softener

| Ingredients | wt % |
| --- | --- |
| Linear alkylbenzene sulfonate | 2 |
| Alcohol ethoxylate | 4 |
| STPP | 23 |
| Polymer Example 7V1 | 5 |
| Na carbonate | 5 |
| Perborate tetrahydrate | 12 |
| Montmorillonite clay | 16 |
| Na sulfate | 20 |
| Perfume, FWA, enzymes, water | Balance |

EXAMPLE 18

Bar/Paste for Laundering

| Ingredients | wt % |
| --- | --- |
| Linear alkylbenzene sulfonate | 15-30 |
| Na silicate | 2-5 |
| STPP | 2-10 |
| Polymer Example 7H1 | 2-10 |
| Na carbonate | 5-10 |
| Calcite | 0-20 |
| Urea | 0-2 |
| Glycerol | 0-2 |
| Kaolin | 0-15 |
| Na sulfate | 5-20 |
| Perfume, FWA, enzymes, water | Balance |

EXAMPLE 19

Water Treatment Compositions

Once prepared, the water-soluble polymers are preferably incorporated into a water treatment composition comprising the water-soluble polymer and other water treatment chemicals. Such other chemicals include corrosion inhibitors such as orthophosphates, zinc compounds and tolyl triazole. As indicated above, the level of the inventive polymer utilized in the water treatment compositions is determined by the treatment level desired for the particular aqueous system treated. The water treatment compositions generally comprise from 10 to 25 percent by weight of the water-soluble polymer. Conventional water treatment compositions are known to those skilled in the art and exemplary water treatment compositions are set forth below in Formulations 1-4. These formulations containing the polymer of the present invention have application in, for example, the oil field.

| Formulation 1 | Formulation 2 |
|---|---|
| 5.0% Polymer 7A2 | 5.0% Polymer 7A3 |
| 47.7% Water | 59.6% Water |
| 4.2% HEDP | 4.2% HEDP |
| 10.3% NaOH | 18.4% TKPP |
| 24.5% Sodium Molybdate | 7.2% NaOH |
| 2.0% Tolyl triazole | 2.0% Tolyl triazole |
| pH 13.0 | pH 12.64 |

| Formulation 3 | Formulation 4 |
|---|---|
| 10.0% Polymer 7H1 | 5.0% Polymer 7V2 |
| 51.1% Water | 59.0% Water |
| 8.3% HEDP | 4.2% HEDP |
| 14.0% NaOH | 19.3% NaOH |
| 4.0% Tolyl triazole | 2.0% Tolyl triazole |
| pH 12.5 | 4.2% $ZnCl_2$ |
| | pH 13.2 |

| Formulation 5 | Formulation 6 |
|---|---|
| 5.0% Polymer 7A2 | 5.0% Polymer 7A3 |
| 46.2% Water | 58.1% Water |
| 3.2% HEDP | 3.2% HEDP |
| 2.5% polymaleic acid | 2.5% polymaleic acid |
| 10.3% NaOH | 18.4% TKPP |
| 24.5% Sodium Molybdate | 7.2% NaOH |
| 2.0% Tolyl triazole | 2.0% Tolyl triazole |
| pH 13.0 | pH 12.64 | where HEDP is 1-hydroxyethylidene-1,1 diphosphonic acid and TKPP is tri-potassium polyphosphate.

EXAMPLE 20

Cement Composition

Various quantities of the polymer produced as described in Example 7A1 above (a 9% by weight aqueous solution of the polymer) were added to test portions of a base cement slurry. The base cement composition included Lone Star Class H hydraulic cement and water in an amount of 38% by weight of dry cement. The base composition had a density of 16.4 pounds per gallon. These compositions containing the polymer of the present invention have application in, for example, the oil field.

EXAMPLE 21

Typical Hard Surface Cleaning Formulations

| Acid Cleaner | |
|---|---|
| Ingredient | wt % |
| Citric acid (50% solution) | 12.0 |
| Phosphoric acid | 1.0 |
| $C_{12}$-$C_{15}$ linear alcohol ethoxylate with 3 moles of EO | 5.0 |
| Alkyl benzene sulfonic acid | 3.0 |
| Polymer of Example 7A3 | 1.0 |
| Water | 78.0 |

| Alkaline Cleaner | |
|---|---|
| Ingredient | wt % |
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of example 7A2 | 1.0 |

EXAMPLE 22

Fiberglass Sizing Formulation

| Ingredient | wt % |
|---|---|
| ALCOSPERSE ® 602A* | 20.0 |
| Polymer Example 7A3 | 5.0 |
| Water | Balance |

*polyacrylic acid from Alco Chemical

EXAMPLE 23

Evaluation of Oxidized Starch as a Dispersant for Iron Oxide

The modified saccharide samples of Examples 7A3 and 7V2 were dissolved in water with stirring. Red iron oxide powder was then added slowly into the starch solution while maintaining stirring. The mixture was stirred for 20 minutes before the viscosity was measured.

TABLE VII

Starch as Iron Oxide Dispersant
65% solids Red Iron Oxide

| | | grams | | | Brookfield Viscosity (spindle #6) | | |
|---|---|---|---|---|---|---|---|
| Starch | % starch | water | starch | iron oxide | 20 | 50 | 100 |
| Example 7A3 | 0.5% | 70 | 1 | 130 | paste | | |
| | 1.0% | 70 | 2 | 130 | paste | | |
| | 2.0% | 70 | 4 | 130 | 12000 | 4860 | 2500 |
| | 2.5% | 70 | 5 | 130 | 3800 | 1900 | 1100 |
| | 3.0% | 70 | 6 | 130 | 4700 | 2620 | 1670 |
| Example 7V2 | 2.0% | 70 | 4 | 130 | 6600 | 3040 | 2030 |
| | 2.5% | 70 | 5 | 130 | 1300 | 940 | 710 |
| | 3.0% | 70 | 6 | 130 | 1050 | 760 | 560 |

Both materials show performance as iron oxide dispersants, though better performance is seen from the lower molecular weight amylose containing material.

EXAMPLE 24

Dispersion of Kaolin

A kaolin slurry was prepared by adding 279 g of kaolin to 171 g of water under high shear. Solutions of oxidized starches were prepared at 10% concentrations. These solutions were then dosed into the kaolin slurry and the viscosity measured. These starch materials were compared to ALCOSPERSE® 149 polyacrylic acid dispersant.

TABLE VIII

Kaolin Dispersion

| Dose | Viscosity (Example 7V2 Starch) | Viscosity (Example 7A3 Starch) | Viscosity (ALCOSPERSE ® 149) |
|---|---|---|---|
| 0.0 | 102 | 102 | 92 |
| 0.05 | 98 | 106 | 92 |
| 0.10 | 104 | 120 | 108 |
| 0.15 | 112 | — | — |

From the above it is seen that the modified polysaccharide of Example 7V2 performs well as a polyacrylate dispersant. It appears that the polyacrylic acid slightly outperforms the oxidized starch; however, the initial slurry viscosity for this experiment was lower. Therefore, the modified polysaccharides are comparable to traditional polyacrylates as dispersants for dispersing kaolin.

EXAMPLE 25

Dispersion of Calcium Carbonate

A slurry was made by addition 306 g of calcium carbonate to 144 g of water under high shear. The oxidized starches of Example 7V2 and Example 7A3 were added to the slurry in the form of a 10% aqueous solution. After each addition of starch the viscosity was measured to produce a dispersant demand curve.

The oxidised starches were compared to ALCOSPERSE® 149 polyacrylic acid homopolymer, which is typically found in this application.

TABLE IX

Dispersion of Calcium Carbonate

| Dose | Viscosity (starch Example 7V2) | Viscosity (starch Example 7A3) | Viscosity (ALCOSPERSE ® 149) |
|---|---|---|---|
| 0.0 | 44 | 44 | 44 |
| 0.05 | 42 | 42 | 48 |
| 0.10 | 42 | 42 | 62 |
| 0.15 | 42 | 44 | — |
| 0.20 | 44 | 48 | — |

The results indicate that the modified polysaccharides of this invention are superior to standard polyacrylic acid.

EXAMPLE 26

Calcium Sulfate (Gypsum Slurry)

| Ingredient | wt % |
|---|---|
| Gypsum | 30-60% |
| Water | 30-60% |
| Sample from Example 7H1 | 0.1-10% |
| Optional adjunct ingredients (preservatives, rheology modifiers, surfactants) | |

EXAMPLE 27

Carbon Black Formulation

| Ingredient | wt % |
|---|---|
| Carbon black | 40% |
| Sample from Example 7V1 | 1-20% |
| Glycol | 0-5% |
| Water | balance |
| Optional adjunct ingredients (preservatives, rheology modifiers, surfactants) | |

EXAMPLE 28

Concrete Formulation

| Ingredient | wt (kg) |
|---|---|
| Portland cement | 315 kg |
| Aggregate | 1926 kg |
| Water | 158 kg |
| Super Plasticizer (Example 7A3) | 120 kg |
| Optional Adjunct ingredients (retarders, air entrainers, accelerators, water proofer, pigment, corrosion inhibitor, plasticizer) | |

EXAMPLE 29

Ceramic Dispersant (Formula Example)

| Ingredient | wt % |
|---|---|
| Clay | 60-75% |
| Dispersant (sodium Silicate, STPP, polyacrylate) | 0-2% |
| Sample from Example 7A1 | 0-5% |
| Water | balance |
| Optional adjunct ingredients (rheology modifier, pigment, surfactant, preservative) | |

EXAMPLE 30

Grinding Aid

An aqueous coarse grain calcium carbonate suspension is passed through a "mill or grinder" to achieve desired particle size. The suspension may be recycled before desired particle size is achieved. Modified polysaccharide of Example 7V2 can be added to the suspension before crushing to help maintain the integrity of the particle through a dispersion mechanism.

EXAMPLE 31

Oil Drilling

| Fresh Water Drilling | |
|---|---|
| Water | 1500 g |
| Bentonite | 60 g |
| Ca bentonite | 150 g |
| Sample from Example 7A2 | 10 g |

Adjunct ingredients—defoamer, corrosion inhibitor, fluid loss agent, shale control, preservative/biocide, buffer, weighting agent

| Salt Water Drilling | |
|---|---|
| Sea water | 1500.0 g |
| NaCO3 | 3.0 g |
| Bentonite | 75.0 g |
| Attapulgite | 112.5 g |
| CMC | 37.5 g |
| Ca bentonite | 225.0 g |
| Caustic | to pH 9-11 |
| Sample from Example 7H1 | 7.5 g |

Adjunct ingredients—defoamer, corrosion inhibitor, shale control, preservative/biocide, buffer, weighting agent

EXAMPLE 32

Soil Anti-Redeposition

The modified polysaccharides of Example 6 were tested for anti-redeposition properties in a generically built liquid detergent formulation. The formulation of the generically built liquid detergent is as follows

| Ingredient | wt % |
|---|---|
| DI water | 37.25 |
| Sodium citrate | 9.00 |
| Propylene glycol | 8.00 |
| 40% Sodium xylene sulfonate | 18.75 |
| BIOSOFT ™ D-40 anionic surfactant (available from Stepan Chemical Co., Northfield, Illinois) | 20.00 |
| NEODOL ® 25-9 detergent alcohol (available from Shell, Houston, Texas) | 7.00 |

Testing was conducted in a full scale washing machine using 3 cotton and 3 polyester/cotton swatches. The soil used was a blend of rose clay (17.5 g), bandy black clay (17.5 g) and oil (6.9 g, 75:25 vegetable/mineral). The test was conducted for 3 cycles using 100 g of liquid detergent per wash load. The modified polysaccharides and the polyacrylic acid (ALCOSPERSE® 602N detergent additive from Alco Chemical) were dosed in at 0.5 weight % of the detergent. Wash conditions used were a temperature of 34° C. (93° F.), 150 ppm hardness and a 10 minute wash cycle.

TABLE X

Soil Anti-Redeposition

| Sample | ΔE | | Δ WI CIE | |
|---|---|---|---|---|
| | Cotton | Poly/cotton | Cotton | Poly/cotton |
| Blank | 1.07 | 1.51 | 3.12 | 5.34 |
| ALCOSPERSE 602N | 0.43 | 0.57 | 1.50 | 2.70 |
| Example 7V3 | 0.72 | 0.65 | 2.35 | 2.79 |
| Example 7H2 | 0.78 | 0.73 | 2.77 | 3.19 |
| Example 7A4 | 0.44 | 0.39 | 1.12 | 1.60 |

L a b values before the first cycle and after the third cycle were measured as $L_1$, $a_1$, $b_1$ and $L_2$, $a_2$, $b_2$, respectively, using a spectrophotometer. ΔE values were then calculated using the following equation $$\Delta E = [(L_1 - L_2)^2 + (a_1 - a_2)^2 + (b_1 - b_2)^2]^{0.5}$$

The data indicates that modified polysaccharides according to the invention have better anti-redeposition/soil suspension properties than the standard 4500 molecular weight polyacrylic acid typically used in detergent applications.

EXAMPLE 33

Liquid Detergent Formulation

| Ingredient | wt % |
|---|---|
| DI water | 37.00 |
| Sodium citrate | 9.00 |
| Propylene glycol | 8.00 |
| 40% Sodium xylene sulfonate | 18.75 |
| BIOSOFT ™ D-40 anionic surfactant (available from Stepan Chemical Co., Northfield, Illinois) | 20.00 |
| NEODOL ® 25-9 detergent alcohol (available from Shell, Houston, Texas) | 7.00 |
| Example 7A4 | 0.25 |

EXAMPLE 34

Fabric Softener Formulation

| Ingredient | wt % |
|---|---|
| Ester quat | 5.0 |
| Example 7V3 | 0.2 |
| Perfume, dye, Water | Balance |

EXAMPLE 35

Blend of Modified Polysaccharides and Synthetic Polymers

The modified polysaccharides of Example 7H1 were blended with a synthetic polymer (ALCOSPERSE® 725 35% aqueous hydrophobically modified polymer solution, available from Alco Chemical, Chattanooga, Tenn.). The 2 components were mixed in a 10:90 and 90:10 weight ratio of active modified polysaccharide to polymer solution. The solutions were then observed after 2 weeks.

TABLE XI

Blends of Synthetic and Natural Polymers

| Solution | Stability after 2 weeks |
|---|---|
| 10% solution of Example 6H1 | Unstable, phase separation |
| Blend of 10% of a 10% solution of Example 7H1 and 90% ALCOSPERSE 725 solution | Clear, stable |
| Blend of 90% of a 10% solution of Example 7H1 and 10% ALCOSPERSE 725 solution | Clear, stable |

The data indicate that the aqueous polysaccharide solution is not stable even at a low dilution of 10 weight percent. However, the blends of this polysaccharide and the hydrophobically modified synthetic polymer are very stable even at high polysaccharide levels. This indicates that synthetic polymers may be used to stabilize aqueous polysaccharide solutions.

EXAMPLE 36

Water Treatment Application for Scale Minimization Without Inhibition

Figure 2:
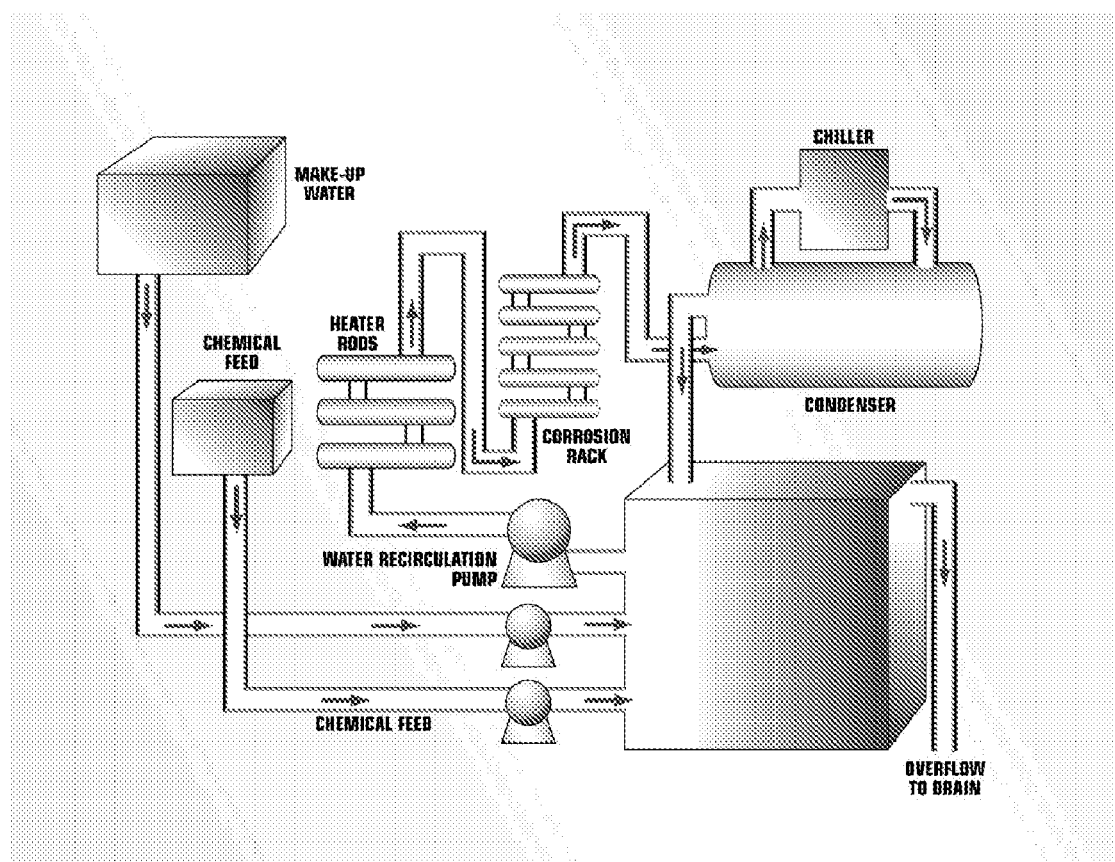
FIG. 2 is a schematic diagram of a non-evaporative dynamic test rig.

The modified polysaccharides of this invention were evaluated in a dynamic system that mimics a pilot cooling tower. The dynamic performance tests were conducted on a non-evaporative dynamic test rig as shown in FIG. 2. The system design allows increasing cycles of concentration by continuous addition of make-up water concentrate and controlled feeding of polymer with an overflow to maintain constant system volume and constant polymer concentration throughout the test. The water volume in the system is approximately 26 liters. The water is contained in a 25 liter basin and pumped through the system and then back into the basin. Upon leaving the basin, the water passes through a heat exchange rack, which includes three heat exchange rods running at approximately 750 watts surrounded by glass tubing for the water to flow through. The heated area of each rod is 11.75 in. This results in a heat transfer rate of approximately 16,000 BTU/hr/ft$^2$. The water then passes through a corrosion rack made of 1 inch CPVC piping, a condenser, and back into the basin. The basin water temperature is controlled through the use of a chiller, which passes cooled water through the condenser. The pH is also controlled through the use of a pH controller and a sulfuric acid feed. A flow meter is also mounted into the system for monitoring the flow rate of the water through the system. The cycles of concentration are controlled and increased through the constant feeding of hardness and alkalinity concentrated solutions. A concentrated treatment feed is also constantly added, in order to maintain the desired dosage levels of treatment within the system.

The simulated make-up water at one cycle of concentration, for all beaker and dynamic testing, consisted of the following concentrations:

100.0 mg/L Ca as $CaCO_3$ (40.0 mg/L as Ca)
49.2 mg/L Mg as $CaCO_3$ (12.0 as Mg)
162 M Alkalinity (141.5 mg/L as $HCO_3$)
23 P Alkalinity (27.6 mg/L as $CO_3$)
Specific Conductivity=~750 micro-mhos The heat transfer rate was maintained at a constant rate of approximately 16,000 BTU/hr/ft$^2$. The flow across the heat exchangers was also kept constant at 3.25 ft/sec.

Three variables in testing were ferrous iron's presence or absence in the make-up water, operating pH, and bulk water temperature. The following ranges were the standard set points used for the testing, including all "standardized" testing for screening samples for scale adhesion properties.

Ferrous Iron=0.2-0.4 mg/L $Fe^{2+}$ (in the make-up water)
Temperature=39.4-40.6° C. (103-105° F.)
pH range=8.70-8.85

The test utilized 3 cycles of hardness. One cycle of hardness is approximately equal to 40 ppm Ca "as Ca", 12.5 ppm Mg "as Mg", 120 ppm $HCO_3$ and 40 ppm $CO_3$. The rods in the test rig were judged by the following scale:
0=no scale on rods
1=scale on dead flow areas only
2=light scale on rods
3=moderate scale on rods
4=heavy scale on rods.

TABLE XII

Calcium Scale Formation

| Modified polysaccharide | Rating of scale on the rods |
|---|---|
| None | 4 |
| Example 7H2 | 0 |
| Example 7A4 | 0 |
| Example 7V3 | 0 |

The above data indicate that even though polymers according to the present invention do not function well in inhibiting $CaCO_3$ (see Example 9 above), they perform very well in actual water treatment conditions at preventing calcium scale formation. This is ascribed to the fact that these polymers function in modifying crystal growth modifiers.

Although the present invention has been described and illustrated in detail, it is to be understood that the same is by way of illustration and example only, and is not to be taken as a limitation. The spirit and scope of the present invention are to be limited only by the terms of any claims presented hereafter.

We claim:

1. A process for preparing a polysaccharide composition comprising:
   oxidizing a polysaccharide in an aqueous medium, the aqueous medium having an oxidant and a mediating amount of nitroxyl radical,
   wherein the resultant modified polysaccharide has of from 1% to about 70 mole % carboxyl groups per mole of polysaccharide anhydrosugar unit ("ASU") and of from 1% to about 20 mole % aldehyde functional groups per mole of polysaccharide ASU, and degrading the oxidized polysaccharide under alkaline conditions.

2. The process according to claim 1 further comprising adding the oxidized, degraded polysaccharide to an aqueous treatment composition.

3. The process according to claim 1 wherein the polysaccharide is a granular starch, the process further comprising filtering and washing the oxidized starch to remove the nitroxyl mediator and any salt by-products prior to degrading the starch.

4. The process according to claim 3 further comprising crosslinking the starch.

5. The process according to claim 4 wherein the starch is crosslinked prior to oxidation.

6. The process according to claim 2 further comprising drying the polysaccharide composition prior to adding it to the aqueous treatment composition.

7. The process according to claim 6 wherein the drying is performed by spray-drying the polysaccharide dispersion.

8. The process according to claim 1 wherein the oxidant has an equivalent oxidizing power of up to 106.37 g active chlorine per mole of polysaccharide ASU.

9. The process according to claim 8 wherein the oxidant has an equivalent oxidizing power of from about 3.55 g to about 99.27 g active chlorine per mole of polysaccharide ASU.

10. The process according to claim 1 wherein the oxidizing is carried out at a temperature of from about 5° C. to about 50° C. and a pH of from about 6.0 to about 11.0.

11. The process according to claim 1 wherein the nitroxyl mediator is a di-tertiary alkyl nitroxyl radical according to one of the following formulas:

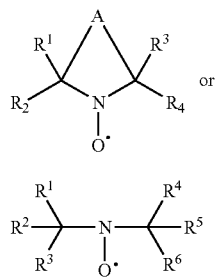

wherein A represents a chain of two or three atoms, and each R group represents the same or different alkyl groups.

12. The process of claim 1 wherein the oxidant is at least one of an alkali or alkaline-earth metal hypohalite salt.

13. The process of claim 1 wherein the oxidizing is carried out in a heterogeneous state or a solution state.

14. The process of claim 1 wherein the degrading is carried out at a temperature of from about 40° C. to about 100° C. and a pH of from about 7 to about 12.5.

15. The process of claim 1 wherein the degrading is carried out from 1 to 40 weight % of the modified polysaccharide with carboxyl and aldehyde functional groups in water.

16. The process of claim 1 wherein the resultant modified polysaccharide has a weight average molecular weight of from about 1000 to about 100,000 and has both carboxyl and aldehyde functional groups present in the C6 position of the ASU.

17. The process according to claim 1 wherein the degrading is carried out at a temperature of from about 40° C. to about 100° C.

18. The process according to claim 1 wherein the degrading is carried out at a pH of from about 7 to 12.5.

19. The process according to claim 1 wherein the degrading step further comprises jet-cooking the oxidized polysaccharide.

* * * * *